US009468783B1

(12) United States Patent
Epstein

(10) Patent No.: US 9,468,783 B1
(45) Date of Patent: Oct. 18, 2016

(54) DRAPING PARTICULATE FILTER FOR THE NOSTRILS AND MOUTH AND METHOD OF MANUFACTURE THEREOF

(71) Applicant: Marc Irwin Epstein, New York, NY (US)

(72) Inventor: Marc Irwin Epstein, New York, NY (US)

( * ) Notice: Subject to any disclaimer, the term of this patent is extended or adjusted under 35 U.S.C. 154(b) by 0 days.

(21) Appl. No.: 15/092,657

(22) Filed: Apr. 7, 2016

Related U.S. Application Data

(63) Continuation-in-part of application No. 14/717,082, filed on May 20, 2015.

(51) Int. Cl.
| | |
|---|---|
| *A41D 13/11* | (2006.01) |
| *A62B 23/06* | (2006.01) |
| *B01D 46/00* | (2006.01) |
| *B05D 5/00* | (2006.01) |
| *B01D 46/10* | (2006.01) |
| *B05D 3/12* | (2006.01) |
| *B23K 26/00* | (2014.01) |
| *B26F 1/24* | (2006.01) |

(52) U.S. Cl.
CPC .............. *A62B 23/06* (2013.01); *A41D 13/11* (2013.01); *A41D 13/1169* (2013.01); *B01D 46/0052* (2013.01); *B01D 46/10* (2013.01); *B05D 3/12* (2013.01); *B05D 5/00* (2013.01); *B23K 26/0087* (2013.01); *B23K 26/359* (2015.10); *B26F 1/24* (2013.01); *B01D 2273/14* (2013.01); *B01D 2275/206* (2013.01); *B01D 2279/40* (2013.01)

(58) Field of Classification Search
CPC .............. A41D 13/11; A41D 13/1107; A41D 13/1169; A62B 23/00; A62B 23/06
USPC .............. 128/857–859, 863, 205.29, 206.12, 128/206.19, 206.25, 206.28
See application file for complete search history.

(56) References Cited

U.S. PATENT DOCUMENTS

| | | |
|---|---|---|
| 2,295,321 A | 9/1942 | Anderson |
| D205,332 S | 7/1966 | Nelson |
| 3,457,917 A | 7/1969 | Mercurio |
| 3,613,678 A | 10/1971 | Mayhew |
| 4,004,584 A | 1/1977 | Geaney |
| 4,240,420 A | 12/1980 | Riaboy |
| 4,536,440 A | 8/1985 | Berg |
| 4,807,619 A | 2/1989 | Dyrud |
| 4,827,924 A | 5/1989 | Japuntich |
| 4,848,366 A | 7/1989 | Aita et al. |
| 4,850,347 A | 7/1989 | Skov |
| 4,873,972 A | 10/1989 | Magidson |
| 5,307,796 A | 5/1994 | Kronzer |
| 5,392,773 A | 2/1995 | Bertrand |
| 5,468,488 A | 11/1995 | Wahi |
| 5,674,481 A | 10/1997 | Wahi |
| 5,765,556 A | 6/1998 | Brunson |
| 6,098,624 A | 8/2000 | Utanaru |
| 6,886,563 B2 | 5/2005 | Bostock et al. |
| 6,923,182 B2 | 8/2005 | Angadjivand |
| 6,945,249 B2 | 9/2005 | Griesbach, III et al. |
| 6,948,499 B2 | 9/2005 | Griesbach, III et al. |

(Continued)

*Primary Examiner* — Alireza Nia
*Assistant Examiner* — Keri J Nelson
(74) *Attorney, Agent, or Firm* — Weitzman Law Offices, LLC

(57) ABSTRACT

Draping particulate filters for use with at least the nostrils is disclosed. The draping particulate filters include diaphanous PM filter material, a biocompatible skin contact adhesive located on at least a skin contact side of part of the diaphanous PM filter material, and at least one line of perforations. Methods of making draping particulate filters are also disclosed.

16 Claims, 17 Drawing Sheets

(56) References Cited

U.S. PATENT DOCUMENTS

| | | |
|---|---|---|
| 6,988,500 B1 | 1/2006 | Cox |
| 7,032,751 B2 | 4/2006 | Bell et al. |
| 7,152,601 B2 | 12/2006 | Barakat et al. |
| 7,294,175 B2 | 11/2007 | Huang et al. |
| 7,451,764 B2 | 11/2008 | Wang |
| 7,827,990 B1 | 11/2010 | Melidis et al. |
| 7,856,979 B2 | 12/2010 | Doshi et al. |
| 7,861,317 B2 * | 1/2011 | Beliveau ............ A62B 99/00 2/9 |
| 7,918,225 B2 | 4/2011 | Dolezal et al. |
| D645,957 S | 9/2011 | Loesser |
| 8,110,061 B2 | 2/2012 | Moore |
| 8,171,933 B2 | 5/2012 | Xue et al. |
| 8,302,607 B2 | 11/2012 | Pierce et al. |
| 8,381,727 B2 | 2/2013 | Matich |
| 8,550,079 B2 | 10/2013 | Moore |
| 2004/0089303 A1 | 5/2004 | Chien |
| 2004/0194784 A1 | 10/2004 | Bertrand |
| 2005/0211251 A1 | 9/2005 | Henderson |
| 2008/0023006 A1 | 1/2008 | Kalatoor |
| 2008/0099022 A1 | 5/2008 | Gebrewold |
| 2008/0271740 A1 | 11/2008 | Gloag et al. |
| 2009/0194107 A1 | 8/2009 | Loeser et al. |
| 2010/0018522 A1 | 1/2010 | Schedletzky |
| 2011/0209710 A1 * | 9/2011 | Spencer, III ....... A41D 13/1107 128/206.12 |
| 2012/0017911 A1 | 1/2012 | Choi et al. |
| 2015/0040910 A1 | 2/2015 | Koehler |

\* cited by examiner

DRAPING PARTICULATE FILTER FOR THE NOSTRILS AND MOUTH AND METHOD OF MANUFACTURE THEREOF

CROSS REFERENCE TO RELATED APPLICATIONS

This application is a continuation-in-part of U.S. patent application Ser. No. 14/717,082 filed on May 20, 2015, the entirety of which is incorporated herein by reference.

BACKGROUND

1. Field

This disclosure relates generally to particulate filters and, more particularly, to particulate filters for at least the nostrils and/or mouth of a user.

2. Background

The World Health Organization has estimated that about 7 million people died from air pollution in 2012 and that, in general one-eighth of all global deaths are linked to air pollution. Of greatest health concern is pollution made up of fine particulate matter of 2.5 microns in diameter or less (called "$PM_{2.5}$"), which is typically, but not exclusively, made up of mineral dust, sulfate and soot particles from burning coal, wildfires and volcanic eruptions, and black carbon from agricultural burning, engine exhausts, and primitive indoor cooking and/or heating. Colloquially referred to as "haze", the problem of airborne particulate matter is greatest across a broad swath of the Earth, stretching from the Saharan Desert in Northern Africa through the Middle East, Northern India and into Eastern Asia, in Borneo, Thailand, and with heaviest concentrations being observed in parts of China and India. When compared with maps of population density, it has been estimated that more than 80% of the world's population breathe polluted air that exceeds the World Health Organization's recommended level of 10 micrograms of particulate matter per cubic meter.

While levels of particulate matter are comparatively low in the United States, pockets have been identified, through satellite analysis, over urban areas in the Midwest and East. Likewise, high levels of particulate matter have been identified through satellite analysis in at least part of the Mexican state of Chihuahua, and to a lesser extent, elevated levels have been detected in pockets of Western Europe as well.

The biggest problem with $PM_{2.5}$ is that $PM_{2.5}$ particulates are small enough to bypass the natural filtration provided by nasal hairs and nasal mucus and thereby can enter the lungs, and in some cases, even pass into the bloodstream. As such, $PM_{2.5}$ can damage lung tissues, cause inflammation that can cause or aggravate respiratory and cardiovascular disease, can cause placental blood toxicity in pregnant women exposed during the first month of pregnancy, and may lead to certain forms of cancer. Adverse health effects have been associated with exposures to $PM_{2.5}$ over periods as short as a day, with greater affects being seen from longer exposure. People who are most at risk are people suffering from asthma or battling influenza, those with lung, heart, or cardiovascular disease, and particularly the elderly, and children and it is routine for haze warnings to be issued when the outdoor Air Quality Index ("AQI") exceeds 100. An AQI of 100 roughly corresponds to a $PM_{2.5}$ level of 40 micrograms per cubic meter of air (averaged over 24 hours), which is slightly more than the short term standard for potentially harmful $PM_{2.5}$ exposure established by the Environmental Protection Agency ("EPA") of 35 micrograms per cubic meter of air.

In an attempt to avoid exposure, particularly in Asian countries, people have resorted to wearing low cost surgical face masks widely available from, among other places, convenience stores. However, such masks are generally not effective because they are designed to prevent the spreading of germs and disease through the exhalation and expulsion of germs by the user and the inhalation of most pollens (which are typically larger than $PM_{2.5}$). Moreover, such masks are uncomfortable, because they require straps that loop around the user's ears to hold them in place and they substantially block the entire lower portion of the user's face. As a result, they are an impediment to, for example, the user eating and/or drinking, blowing their nose, etc., requiring them to remove the mask to perform those activities.

Enhancements to such masks to provide for better filtration of $PM_{2.5}$ have been attempted, for example, through the addition of a layer of activated carbon or more specialized filters, but such enhancements can significantly increase the cost, size and obtrusiveness of the masks, making them unsuitable for mass use, particularly in poorer areas of the world where the problem is greatest.

In an effort to avoid some of those issues, attempts have been made to create filtering devices that are inserted as plugs into a user's nostrils to augment or supplant the natural particle catching ability of the nose itself. Thus, while such devices allow for eating and drinking, those filtering devices they do not allow for blowing one's nose without removal and do nothing to prevent particulate matter from entering the body via the mouth. In addition, those devices, being foreign bodies to the nasal cavities and bulky, can themselves trigger sneezing responses in the putative user, rendering them unusable. Even as to users who do not have a sneezing response to such devices, since they must block the nasal passages, they are often uncomfortable to wear and, some types, can be dislodged by strong exhalation or naturally simply through normal breathing over time, leading many users to dispense with using them entirely.

Thus, there is a significant need for a filtration device that can reduce potentially harmful $PM_{2.5}$ exposure and that does not require insertion into the nostrils, is not as obtrusive as a face mask, and conveniently allows for eating and drinking when necessary.

BRIEF SUMMARY

I have devised a particulate filter for the nostrils and/or mouth that can reduce potentially harmful $PM_{2.5}$ exposure in a way that is easy to manufacture, convenient, and less intrusive than a face mask.

One aspect of this disclosure involves a draping particulate filter for use in front of at least a user's nostrils. The draping particulate filter includes diaphanous PM filter material, at least one affixation region, associated with a top portion of the diaphanous PM filter material, a biocompatible skin contact adhesive at least located within the at least one affixation region on a skin contact side of the draping particulate filter, and at least one line of perforations spanning from a first side of the diaphanous PM filter material to a second side of the diaphanous PM filter material, the at least one line of perforations being located between a first portion and a second portion, the first portion defining a nasal filtration region and the second portion defining a mouth filtration region. The at least one line of perforations will allow for separation of the second portion from the first portion such that, following separation, only first portion that defines the nasal filtration region will be part of the draping particulate filter.

The draping particulate filter also has an outer peripheral shape bounding the diaphanous PM filter material such that, when adhered to either side of a user's nose via the biocompatible skin contact adhesive within the at least one affixation region, the diaphanous PM filter material below the at least one affixation region will hang free in front of the user's face and will substantially lie in close proximity to a portion of the user's face so that, upon inhalation by the user through their nostrils, the first portion of the hanging diaphanous PM filter material will be drawn towards the nostrils and act as the nasal filtration region and, upon inhalation by the user through their mouth, if the second portion has not been separated from the first portion using the at least one line of perforations, the second portion of the hanging diaphanous PM filter material will be drawn towards the mouth and act as the mouth filtration region.

Upon exhalation by the user through their nose, the nasal filtration region of the diaphanous PM filter material will move freely away from the user's nostrils, and, if the second portion has not been separated from the first portion using the at least one line of perforations, upon exhalation by the user through their mouth, the second portion of the hanging diaphanous PM filter material will move freely away from the user's mouth.

Another aspect of this disclosure involves a draping particulate filter making method. The method involves forming, on a sheet of diaphanous PM filter material, a peripheral boundary for the particulate filter having therewithin an intended inhalation region; forming at least one line of perforations passing through the intended inhalation region; and defining at least one affixation region near an edge of the particulate filter by applying a biocompatible skin contact adhesive therewithin, such that when the biocompatible skin contact adhesive attaches the draping particulate filter to a user by the alar nasal sulcus, the nasal lobule, the nasal ala, or beneath the nasal base across the user's philtrum, the diaphanous PM filter material will hang freely in a draped fashion in close proximity to the user's face such that inhalation by the user via a breathing orifice will cause the diaphanous PM filter material to move towards and against the breathing orifice by which the user is inhaling and filter the inhaled air, and exhalation by the user will cause the diaphanous PM filter material to move away from user's face.

A further aspect of this disclosure involves draping particulate filter making method. The method involves: forming, on a sheet of diaphanous PM filter material, a peripheral boundary for the particulate filter having therewithin an intended inhalation region, the peripheral boundary including a pair of tabs; forming at least one line of perforations passing through the intended inhalation region; and defining at least one affixation region near an edge of the particulate filter by applying a biocompatible skin contact adhesive to the pair of tabs, such that when the biocompatible skin contact adhesive attaches the draping particulate filter to a user by the alar nasal sulcus, the nasal lobule, the nasal ala, or beneath the nasal base across the user's philtrum, the diaphanous PM filter material will hang freely in a draped fashion in front of the user's face, and in close proximity to a breathing orifice of the user, such that inhalation by the user will cause the diaphanous PM filter material to move towards and against the breathing orifice and filter the inhaled air, and exhalation by the user will cause the diaphanous PM filter material to move away from the user's face.

Advantageously, the draping configuration allows the user to perform activities such as eating, drinking, blowing the nose, and sneezing without removing the filter entirely, while not requiring that it be affixed using straps over the ears or behind the head.

Moreover, the draping configuration does not impede exhalation, making it cooler for the user and more beneficial because the user will not re-breathe $CO_2$-laden stale air.

Still further, the draping configuration makes it easier for the user to talk when the draping particulate filter is in front of their mouth, because it flaps out from the mouth, and can make the user easier to understand as well because typically it will not muffle the speaker's voice the way conventional filters often do.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings wherein the same reference number in different figures represent the same thing, and in which.

DETAILED DESCRIPTION

I have devised a particulate filter configuration for the nostrils and mouth that can be manufactured as a flat sheet, does not need to be inserted into the nostrils at all, is reposition-able, and conveniently allows for activities such as eating, drinking, blowing one's nose while providing greater protection than removal of a face mask would provide.

For simplicity, as used herein, the term "diaphanous PM filter material" is intended to mean any light, floaty, supple, flimsy and/or thin particulate filter material, including nanofiber or carbon nanotube filter material, that has a filter efficiency of at least $PM_{2.5}$ and, more ideally, a filter efficiency of at least $PM_1$, and a differential pressure $\Delta P$ ("breathability") measurement of <5 $mmH_2O/cm^2$ as measured according to ASTM F2100, European standard EN 14683 or other appropriate alternative standard such that an inhalation-induced pressure differential, or suction caused by inhalation, will cause the material to move in the direction of and with the moving air.

In simplified overview, I have created a draping particulate filter that is made of a diaphanous PM filter material that has a peripheral shape and origami-type folds or living hinges such that, when worn, it lies draping in close proximity to the nostrils and mouth such that inhalation through the nose will cause it to substantially cover the nostrils, and inhalation through the mouth will cause it to substantially cover the mouth, in order to filter out at least $PM_{2.5}$ matter while being minimally affixed to part of the user's nose in a draping manner. This draping configuration helps ensure that exhaled air is not trapped in front of the nostrils or mouth, so the user does not re-breathe stale exhaled air. Moreover, using a draped configuration allows filters designed according to the teachings herein to more freely move away from the user and thereby reduces the amount of their exhaled $CO_2$ that the user will re-breathe upon inhalation. Optionally, some filters constructed according to the teachings herein will include perforations that will, for example, allow for the length of the overall filter to be reduced for persons with smaller faces or to allow for removal of that portion of the filter that would drape in front of a user's mouth.

Figure 1A:
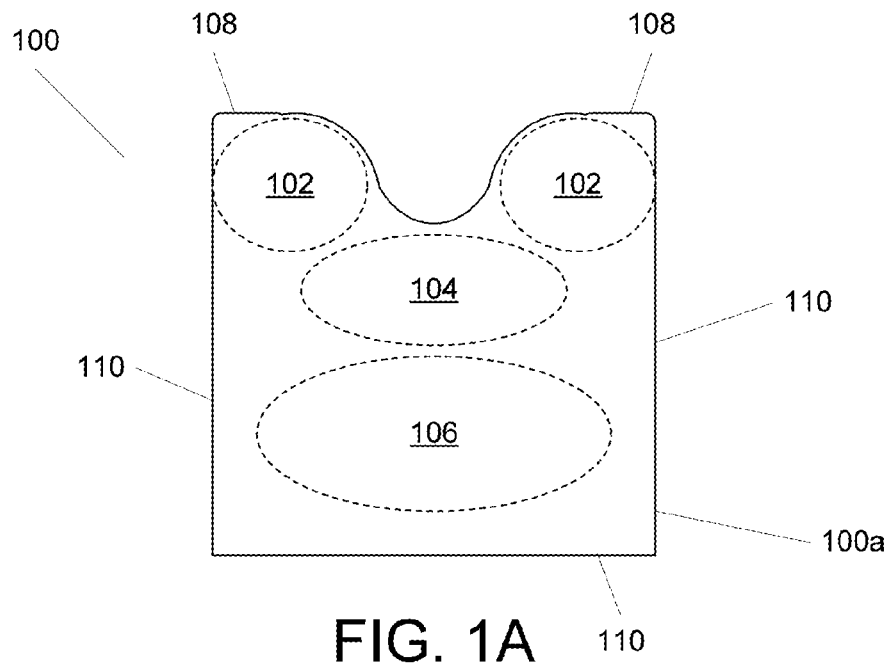
FIGS. 1A-1B illustrate, in simplified form, functional examples of two different alternative implementations of a draping particulate filter constructed according to the teachings herein.
Figure 1B:
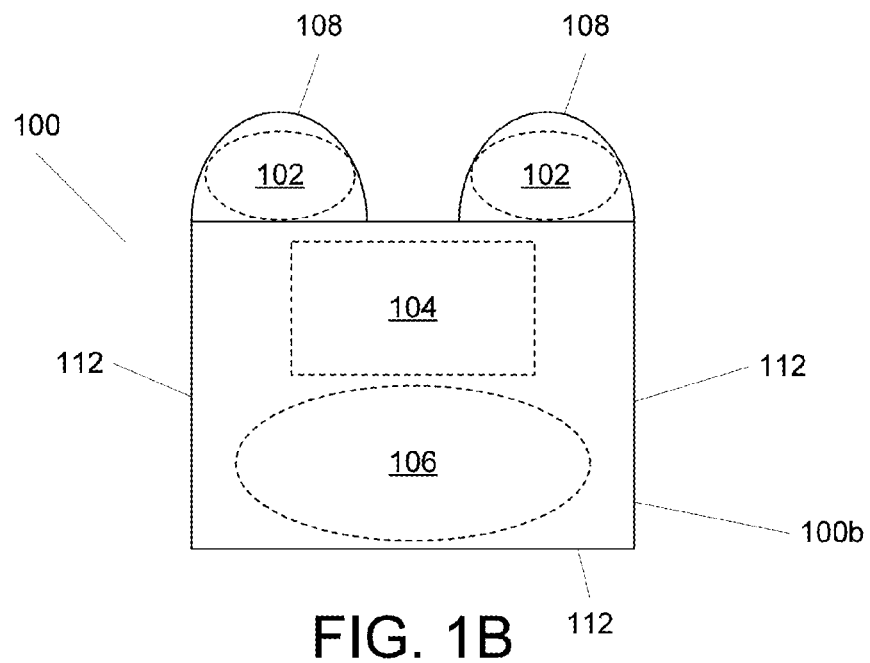

FIGS. 1A-1B illustrate, in simplified form, functional examples of two different alternative implementations 100a, 100b of a draping particulate filter 100 constructed according to the teachings herein. As shown, the draping particulate filter 100 has three functional regions, the affixation regions 102, the nasal filtration region 104 and the mouth filtration region 106. These three regions define the operational areas of different embodiments of draping particulate filters 100 constructed according to the teachings herein, irrespective of shape of the peripheral boundary 108 that any particular embodiment of the draping particulate filter 100 may have.

Functionally, the affixation region is within at least a portion of a pair of tabs 108 or protrusions of the draping particulate filter 100, or, in the case of alternative "tab-less" versions described herein, near the edge of the draping particulate filter 100 that will be attached to the user and from which the draping particulate filter 100 will freely hang. The affixation region contains a biocompatible skin contact adhesive (interchangeably also referred to as a "soft skin adhesive") that removably and/or reposition-ably attaches that portion of the draping particulate filter 100 to the user, as described in greater detail below. Advantageously, to the extent tabs are provided, the tabs 108 may be any size or shape sufficient to ensure proper adhesion to the user while allowing the diaphanous PM filter material to be positioned such that it drapes in front of, and in close proximity to, the user's nostrils and/or mouth.

The nasal filtration region 104 defines the area that, when the draping particulate filter 100 is properly applied to a user, is in close proximity to, or covers, at least the nostrils or naris of the user to filter the particulate matter.

The mouth filtration region 106 is similar to the nasal filtration region 104 and defines the area of the draping particulate filter 100 that, when properly applied, will be drawn toward the mouth, during mouth inhalation, to filter particulate matter from the air entering via the user's mouth.

It should be understood at this point that both the nasal filtration region 104 and mouth filtration region 106 obtain their role(s) based upon positioning of the draping particulate filter 100 during usage. Thus, in general, as will be described later herein, with an alternative example draping particulate filter 100, if the tabs 108 are respectively positioned on at least a portion of the alar nasal sulcus, the nasal lobule and/or the nasal ala on either side of the user's nose, the portion of the draping particulate filter 100 immediately below the tabs 108 will hang draped in front of the user's nostrils and thereby act as the nasal filtration region 104, whereas, if the tabs 108 are attached to the user within the area between the user's nasal base (i.e., under their columella) to either side of the user's philtrum and predominantly between the nasal labial folds, the portion of the draping particulate filter 100 immediately below the tabs 108 will exclusively hang draped in front of the user's mouth and leave the user's nostrils exposed. Thus, it is to be understood, by way of that example, that the same portion of a draping particulate filter would serve as the nasal filtration region 104 in the former case and the mouth filtration region 106 in the latter case.

As shown in the example of FIG. 1A, the entire area within the peripheral boundary 110 is made up of the diaphanous PM filter material, whereas, as shown in the example of FIG. 1B, the rectangular boundary area 112 (i.e., exclusive of the tabs) is made up of the diaphanous PM filter material, but the tabs 108 may be made of some other material as will be described in greater detail below. Advantageously, the peripheral boundary shape can be any shape provided that there is a sufficient margin of material around the nasal filtration region 104 and mouth filtration region 106 to allow the diaphanous PM filter material to substantially seal about the nostrils or mouth during inhalation to maximize the amount of air subject to filtration.

Figure 2A:
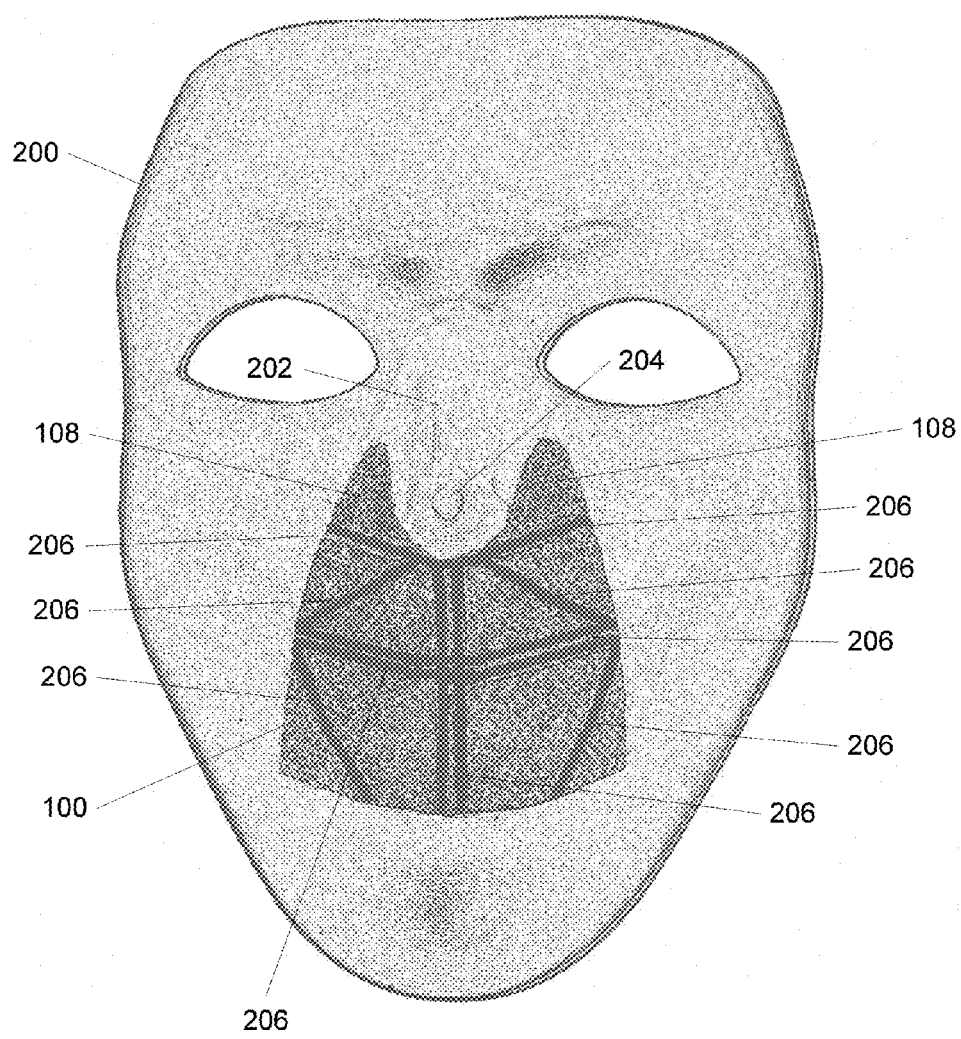
FIG. 2A illustrates, in simplified form, a front view of one example implementation of a draping particulate filter constructed as described herein, positioned on a representation of a human face.
Figure 2B:
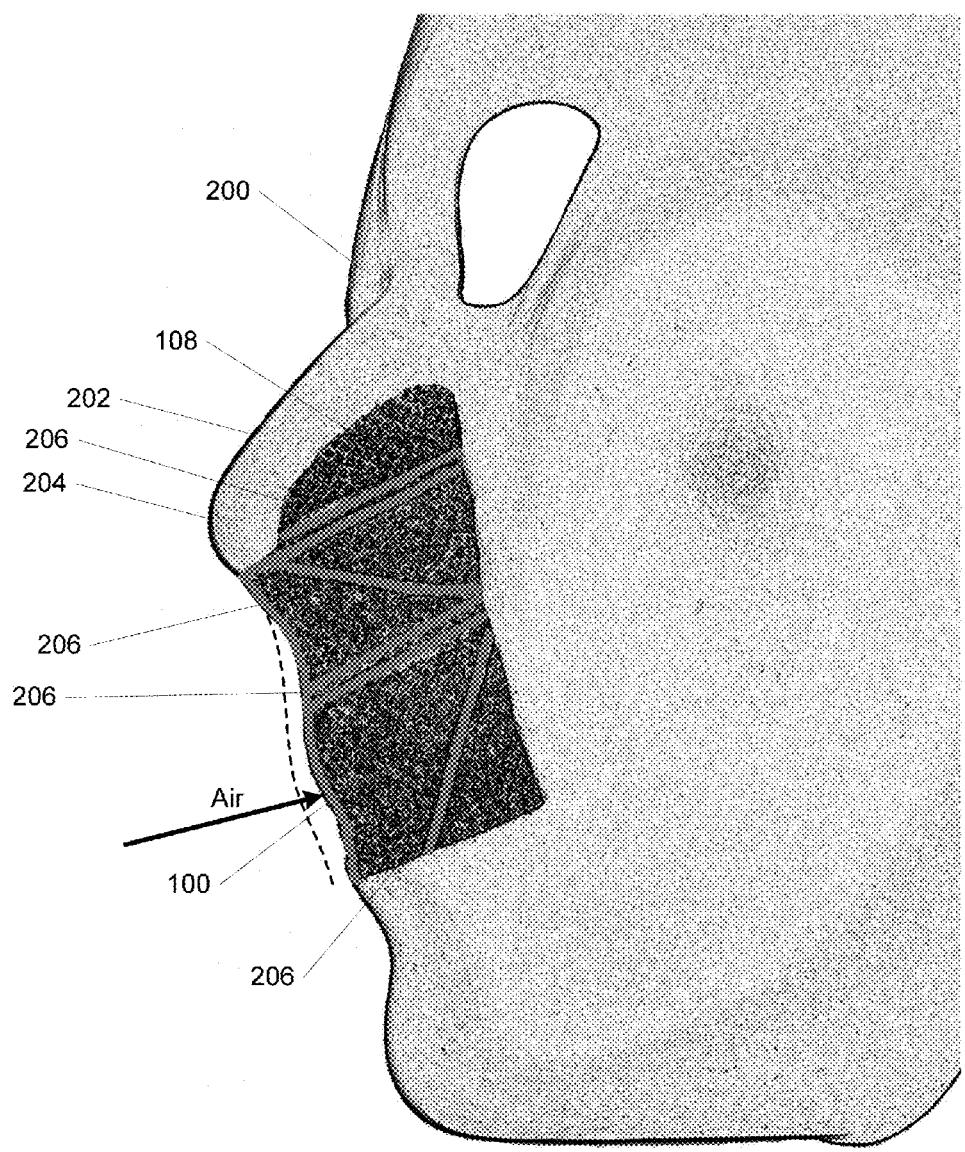
FIG. 2B-2C illustrate, in simplified form, an angled partial side perspective view of the representation of the human face of FIG. 2A.
Figure 2C:
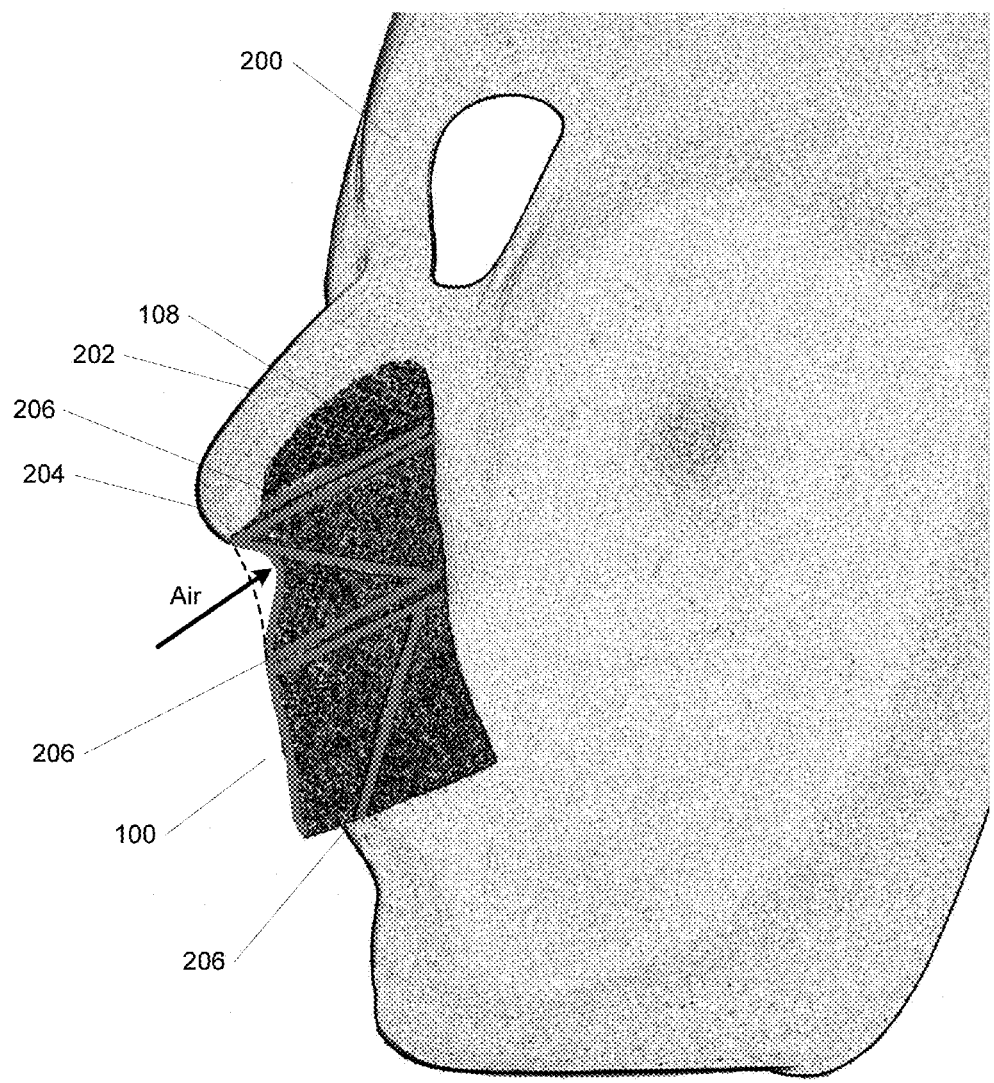

In most cases, the tabs 108 are used to affix the draping particulate filter 100 to at least a portion of the alar nasal sulcus, the nasal lobule and/or the nasal ala on both sides of the user's nose so that, the remainder of the draping particulate filter 100 is still fairly freely movable with the nasal filtration region 104 being in front of and in close proximity to the user's nostrils, the mouth filtration region 106 being in front of and in close proximity to the user's mouth, and the peripheral edges of the draping particulate filter 100 being in substantially close proximity to the user's face. This is illustrated in FIGS. 2A-2C. Moreover, in some implementations, the shape of the tabs 108, and the space in between them, are formed to help automatically ensure proper placement of the draping particulate filter 100 by the user when applying to, or repositioning it on, their nose. In other implementations, the shape of the portion of the draping particulate filter 100 containing the affixation region can be formed without specific tabs but in a way that assists in proper positioning the draping particulate filter 100 in either that manner or under the nasal base and between the nasal labial folds for use solely as a particulate filter that drapes in front of the user's mouth.

FIG. 2A illustrates, in simplified form, a front view of one example implementation of a draping particulate filter 100 constructed as described herein, positioned as it would be in use on a representation 200 of a human face. FIG. 2B illustrates, in simplified form, an angled partial side perspective view of the representation 200 of the human face of FIG. 2A showing the draping particulate filter 100 up against the user's mouth while air is being drawn in through the mouth (i.e. in the direction of the arrow during inhalation). As can be seen in FIG. 2B, the suction and/or lower pressure due to the inhalation through the mouth, causes the draping particulate filter 100 to move from its draped position closely in front of the mouth (indicated by the dashed line) to a position up against the mouth. Likewise, FIG. 2C illustrates, in simplified form, an angled partial side perspective view of the representation 200 of the human face of FIG. 2A showing the draping particulate filter 100 up against the user's nostrils while air is being drawn in through them (i.e. in the direction of the arrow during inhalation). As can also be seen in FIG. 2C, the suction and/or lower pressure due to the inhalation through the nostrils, causes the draping particulate filter 100 to move from its draped position closely in front of the nostrils (indicated by the dashed line) to a position up against the nostrils.

As can be seen in FIGS. 2A-2C, the tabs 108 of the draping particulate filter 100 are arranged such that the dorsum 202 and apex 204 of the nose are not covered, making the draping particulate filter 100 less obtrusive than a conventional face mask that uses ear straps, or straps that fit behind the head, to hold the mask in place.

As can be further seen in FIGS. 2A-2C, the draping particulate filter 100 includes a series of origami-like folds, non-perforating scores or living hinges, or some combination thereof, 206 (interchangeably referred to herein as "creases" and described in greater detail below) that alter the shape during use and/or provide for articulation of a part of the draping particulate filter 100 at specified locations to thereby allow the draping particulate filter 100 to more closely conform to a range of user nostril and mouth sizes and shapes when draped.

Figure 3A:
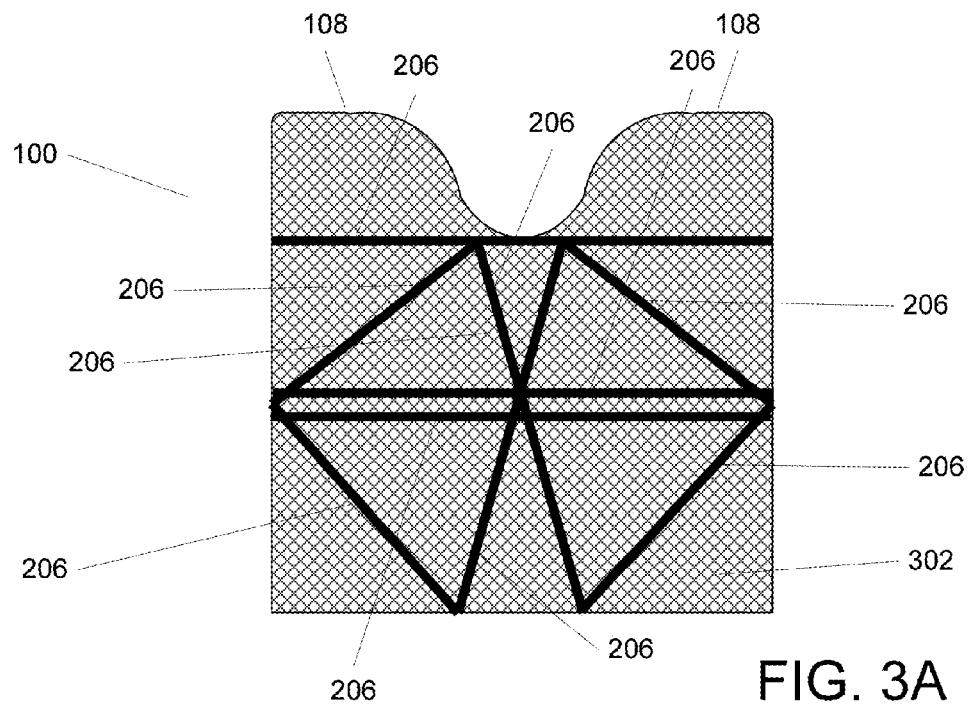
FIGS. 3A-3C illustrate, in simplified form, three alternative example implementations of particulate filters 100 constructed as described herein.
Figure 3B:
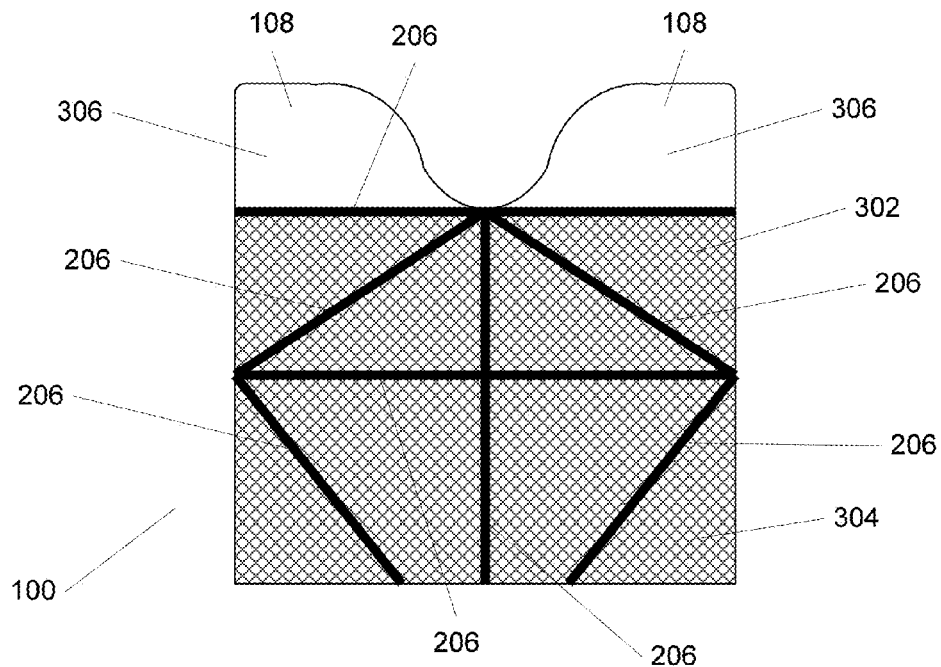
Figure 3C:
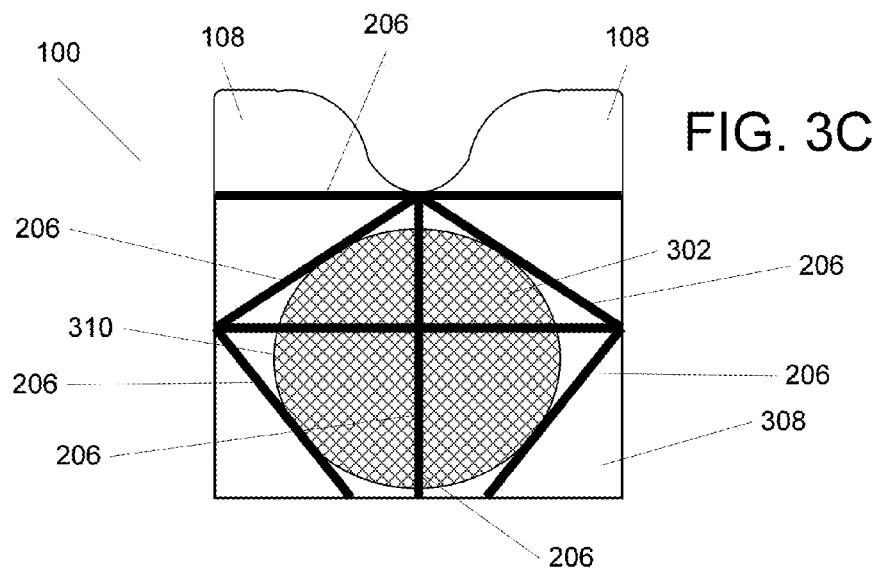

FIGS. 3A-3C illustrate, in simplified form, three alternative example implementations of draping particulate filters 100 constructed as described herein.

As noted above, and shown more clearly in FIG. 3A, the draping particulate filter 100 is made up entirely of the diaphanous PM filter material 302 (indicated by crosshatching) and includes the series of creases 206 that create articulation points or shape alterations for the filter 100 when worn. The user makes use of the creases 206 when applying the filter 100, typically by simple application of pressure to the creases once the tabs 108 have been applied to at least a portion of the alar nasal sulcus, the nasal lobule and/or the nasal ala on both sides of the user's nose, so that the nasal filtration region 104 (FIG. 1) lies draping in close proximity to or over the user's nostrils, the region of the filter 100 below the nasal filtration region 104 then lies draping in close proximity to the front of the user's mouth, and the outer periphery 110 of the filter 100 lies in close proximity to part of the user's face. At this point it should be noted that the term "close proximity" is intended to simply mean close enough such that normal inhalation will draw the diaphanous PM filter material to and against the orifice (nostril and/or mouth) and result in the diaphanous PM filter material forming a seal substantially around the periphery of the nostril(s) and/or mouth such that most, if not all, of the inhaled air will pass through the diaphanous PM filter material.

Depending upon the particular implementation, in general, the locations of the creases 206 for different filters 100 can be placed differently to accommodate or allow for nostrils and mouths of different sizes, spacing and/or shapes. Alternatively, a particular filter 100 implementation can have multiple sets of creases 206 such that a single filter 100 can accommodate nostrils and mouths of different sizes, spacing and/or shapes depending upon the particular creases 206 that are used. Moreover, one or more particular creases 206 can be placed so as to allow a user to fold up a part of the filter 100 that is in front of the mouth, for example, to allow for eating and/or drinking, while leaving the portion of the that filters $PM_{2.5}$ from entering the user's nostrils in place or to fold up the filter such that both the mouth and nostrils are exposed to, for example, accommodate blowing the nose, without removing the filter tabs 108. Thus, when the particular activity is done, the user can merely fold back down that portion and filtering will resume.

In other words, there is no requirement that any particular crease 206 be placed in the specific locations shown or must be used for any particular user's face, the particular placement of the creases 206 being an implementation detail.

At this point it is important to note that the draping particulate filters described herein are designed to filter at least $PM_{2.5}$ during user inhalation and serves little to no purpose during user exhalation, hence the ability to use a draping configuration. Moreover, most people, under normal circumstances, primarily inhale through their nostrils but may inhale through their mouth during certain activities like talking and some aerobic activity. Advantageously, by using a diaphanous PM filter material, because it is so light and floaty, and the creases keep it in close proximity to the user's nostrils and mouth, the beginning of inhalation through the nostrils and/or mouth will draw the diaphanous PM filter material towards the nostrils and/or mouth and cause it to substantially seal against the user such that a substantial portion of the inhaled air will respectively pass through the nasal filtration region 104 and/or mouth filtration region 106 and be filtered thereby.

FIG. 3B illustrates, in simplified form, another alternative example implementation draping particulate filter 100, in this case one made of two pieces. As shown, with this configuration draping particulate filter 100, only a portion 304 is made up of the diaphanous PM filter material 302, and the portion 306 containing the affixation region that acts as the tabs 108 is made of a different material which is bonded in some suitable known way to the portion 304 made up of the diaphanous PM filter material 302. With this configuration, the material that is chosen for the tabs 108 can be any material that does not compromise the filtering through the nasal filtration region 104 during inhalation by creating a bypass path.

FIG. 3C illustrates, in simplified form, yet another alternative example implementation draping particulate filter 100. The draping particulate filter 100 of FIG. 3C is made up of a portion 308 that is very light and flimsy, but in this example is substantially air impervious, and a portion 310 made up of the diaphanous PM filter material 302. Depending upon the particular implementation, the portion 310 can be a single area encompassing the nasal filtration region 104 and mouth filtration region 106, it can be separate areas for the nasal filtration region 104 and mouth filtration region 106, or it can be further broken down into discrete diaphanous PM filter material 302 for each nostril and one or more pieces for the mouth inhalation filtration.

Materials suitable for manufacture of draping particulate filters 100, as described herein, will now be described.

In general, materials suitable for use as the diaphanous PM filter material include, for example (but are by no means intended to be limited to), Nanovia Dust Protection Membrane NW 70, Nanovia AntiVirus SMNF 57 Membrane, Nanovia Clean Air NW 60, Nanovia Surgical Mask 20 and Nanovia Surgical Mask 40 materials, commercially available from Nanovia Ltd., Podkrusnohorska 271, 436 03 Litvinov-Chuderin, Czech Republic (www.nanovia.cz), as well as carbon nanotube filter sheeting described in O. Yildiz et al., Carbon, Vol. 64, pp. 295-304 (2013) and any other nanofiber HEPA-type filter material that and is sufficiently diaphanous to operate as described herein and can be provided with creases as described herein, while still meeting the definition of "diaphanous PM filter material" provided above.

Materials suitable for the tabs 108, as described herein, if not made of the diaphanous PM filter material, include (but are by no means intended to be limited to), most medical and/or surgical grade pressure sensitive adhesive tapes, for example tapes commercially available from 3M sold under the Medipore™, Medipore™, Micropore™, and Transpore™ brands, and SC Thermoplastic Elastomer Film Tape 2475P or similar tapes from other manufacturers. Moreover, if enhanced unobtrusiveness is desired, then clear tapes or tapes closely approaching user skin color will be preferable to opaque tapes that likely will contrast highly with a user's skin. Alternatively, as indicated above, other substrates or the diaphanous PM filter material itself can be used for the tabs 108, provided an appropriate skin contact adhesive is applied so that the tabs 108 can be removably adhered to the skin of the nose, such adhesives including (but by no means are intended to be limited to), for example, P_DERM™ brand skin contact adhesives commercially available from Polymer Science Inc., 2787 S. Freeman Rd., Monticello, Ind. 47960, Dow Corning® 7-9700 Soft Skin Adhesive, commercially available from Dow Corning Corp., PO Box 994, Midland, Mich. 48686-0994, skin contact adhesives based upon Baymedix® A, commercially available from Bayer MaterialScience AG, 51368 Leverkusen, Germany (www.baymedix.com), and Silbione® skin adhesives commercially available from Bluestar Silicones, Two Tower Center Blvd., Suite 1601, East Brunswick, N.J. 08816. Thus, it should be understood that the important aspect for the tabs 108 is that they can removably attach the draping particulate filter 100 to the user via an appropriate adhesive, not the particular material or adhesive that is used to do so, the selection of particular material(s) for the tabs being one of implementation design choice. One factor that may influence the particular adhesive used is the way that it will be applied. Some adhesives are best applied through roller or spray application, whereas others are easily applied using, for example, pattern printing.

In the case where two different materials are used to make particulate filters 100 as described herein, e.g., the diaphanous PM filter material and some other material are to be joined together, any appropriate method for doing so that does not adversely affect the diaphanous PM filter material from filtering or moving as described herein may be used.

Having described different materials suitable for manufacture of particulate filters 100, as described herein, various example methods of manufacture of such filters 100 will now be described.

Crease Formation

Depending upon the particular implementation, creases 206 can be formed in, for example, any one or more of the following ways. The creases 206 can be formed using origami and/or oribotics techniques involving repeated folding and unfolding that weaken the areas along the fold lines such that movement will more easily occur along those lines. The creases 206 can be formed by slightly scoring or cutting into one or both sides of the surface of the diaphanous PM filter material provided that the filtration efficiency in the area of the cuts (i.e. caused by the depth of the score(s) or cut(s)) does not cause that area to not meet the diaphanous PM filter material definition, even though the efficiency may be degraded in those areas. The creases 206 can be formed by application of localized pressure and/or heat that compresses or otherwise deforms the fibers of the diaphanous PM filter material so as to weaken that area and/or thin the material in one area relative to the surrounding material and thereby form living hinge-type flex points. Other methods of crease 206 creations can also be used, the important aspect being the creation of the creases 206 if needed to ensure the diaphanous PM filter material will properly drape in front of the nostrils and/or mouth during use, not the manner in which they are created.

Perforation Formation

Depending upon the particular implementation and material, the perforations described herein can be formed by any of multiple methods. By way of representative example, a laser can be used to form the perforations by cutting or melting the diaphanous PM filter material, one or more knives can be used to cut the diaphanous PM filter material, and micro-perforations can be formed using any known method suitable for the diaphanous PM filter material. Alternatively, in some cases, the perforations can be formed by piercing the diaphanous PM filter material with one or more needles. In short, the important aspect is the formation of the perforations, not the way in which they may be formed, due to the fact that the particular method may depend upon the particular diaphanous PM filter material being used.

Moreover, in some cases, it may be advantageous to form the perforations on one or more creases or between two closely spaced creases, post-crease formation, for example, where the crease formation strengthens the diaphanous PM filter material in the crease area, thereby improving the resistance of the diaphanous PM filter material to tearing outside of a line of perforations.

Filter Creation

The overall creation of the particulate filters 100 can follow any of several approaches, bearing in mind that the specific ordering of the steps may be varied in different implementations that still result in a draping particulate filter 100 as described herein, the important aspect being the performance of the steps, not any particular ordering thereof.

In some cases the draping particulate filters 100 will be manufactured purely from the diaphanous PM filter material. In those cases, the process involves: (a) cutting the specific peripheral shape so as to form the tabs 108, or for tab-less configurations, the boundary edge the affixation region will be near, and to also encompass the nasal filtration region 104 and mouth filtration region 106 with sufficient material border around them to allow for drawing against part of a user's face during inhalation while minimizing infiltration of unfiltered air from the periphery, forming the creases 206, and (c) applying the appropriate adhesive to what will be the affixation regions 102, with (a) through (c) occurring in any order.

Figure 4:
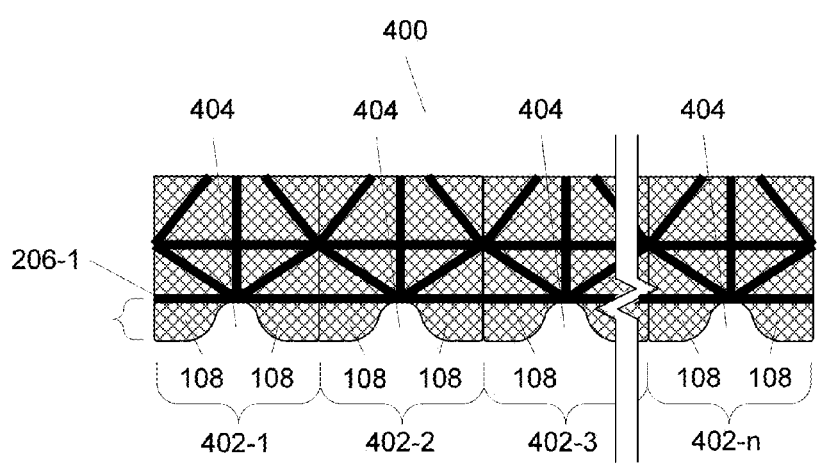
FIG. 4 illustrates, in simplified form, a strip of particulate filters 100 constructed according to the teachings herein.

In other cases the filters 100 will be created in a strip configuration. FIG. 4 illustrates, in simplified form, a strip 400 of particulate filters 100 constructed according to the teachings herein. As shown, the strip 400 is made up of a single row of individual 402-1, 402-2, 402-3, 402-*n* particulate filters 100. The filters are created by, in appropriate order, (a) forming the creases 206, (b) applying the selected adhesive to the affixation region or area for the tabs 108 on the tab side of the lowermost (in the figure) crease 206-1, (c) for tab configurations, removing the areas 404 that would impact the apex of a user's nose so as to intrinsically form the tabs 108. Once steps (a)-(c) are complete, depending upon the particular implementation, cuts can be made to separate the individual filters 100 402-1, 402-2, 402-3, 402-*n*. Alternatively, perforations can be made between the individual filters 100 402-1, 402-2, 402-3, 402-*n* so that they can be provided in an accordion folded strip or roll form and easily separated later.

For a strip of this type where the tabs 108 will be a separate piece, in appropriate order, steps (a)-(c) would be performed on the diaphanous PM filter material. The tabs 108 would be formed and then joined to the diaphanous PM filter material, or the material for the tabs would be joined to the diaphanous PM filter material and then formed. If the material for the tabs is not a tape or other material that comes with adhesive already applied, then the adhesive could be applied before or after forming the tabs 108 or joining of the tab material to the diaphanous PM filter material, depending upon the particular implementation. To join the tab material to the diaphanous PM filter material any appropriate method may be used including, for example, head bonding or adhesive.

With still other implementations, the filters 100 will be created by adding a release liner or backing to the diaphanous PM filter material and then forming the peripheral shape for the respective filters 100. The release liner or backing can advantageously give the diaphanous PM filter material more "substance" than it would have by itself due to its light, floaty, supple, flimsy and/or thin nature and thereby make it easier for the user to apply the filter and then remove the release liner/backing once applied.

In cases where the diaphanous PM filter material is backed by a release liner or backing, the peripheral shape for the individual draping particulate filters can specifically be formed using any of multiple appropriate known processes, such as, by way of non-limiting representative example, kiss cutting, butt-cutting, die cutting, thermal die cutting, guillotine cutting, face scoring, laser cutting, etc. For example, scoring/creasing and perforating the diaphanous PM filter material followed by kiss-cutting the outer periphery but not through the release liner or backing and then butt cut through the release liner or backing. In overview, "kiss cutting" would cut through the diaphanous PM filter material but not cut through the release liner/backing on which it lays. "Butt cutting" is essentially the same as "kiss cutting" on a liner/backing but there is no space between two discrete adjacent individual draping particulate filters, whereas with kiss cutting, there could be scrap material between two adjacent draping particulate filters. With "die cutting" a steel die would be used to cut individual draping particulate filters out of the diaphanous PM filter material. "Thermal die cutting" is a hybrid approach that uses a combination of heat and pressure to "kiss cut" the draping particulate filters. "Guillotine cutting" is similar to die cutting except that the draping particulate filters would be cut out using a blade. "Face scoring" is typically a two step cutting method, involving kiss cutting the individual draping particulate filters and then guillotine cutting to form strips of the draping particulate filters. Finally, "laser cutting" is similar to the above approaches but uses laser(s) for the cutting instead of dies or blades. In cases where the diaphanous PM filter material does not have any type of backing, any method of forming the peripheral shape appropriate for the particular material can be used.

As noted above, some example implementations may also optionally include at least one line of perforations running across the diaphanous PM filter material to allow for, in some cases, reducing the length of the filter 100 when applied to a user's nose via the tabs 108 or, in other cases, to separate and remove the mouth filtration region 106 from the overall filter 100, such that the tabs 108 remain along with the nasal filtration region 104, or in still other cases, to allow for the affixation region of the filter 100 to be attached to the user beneath the nasal base near the columella and between the nasal labial folds so that the remaining portion will serve as the mouth filtration region 106 of the filter 100. Likewise, some example implementations can be ready made so that they do not contain perforations, but are sized for use with only the nostril filtration region.

Figure 5:
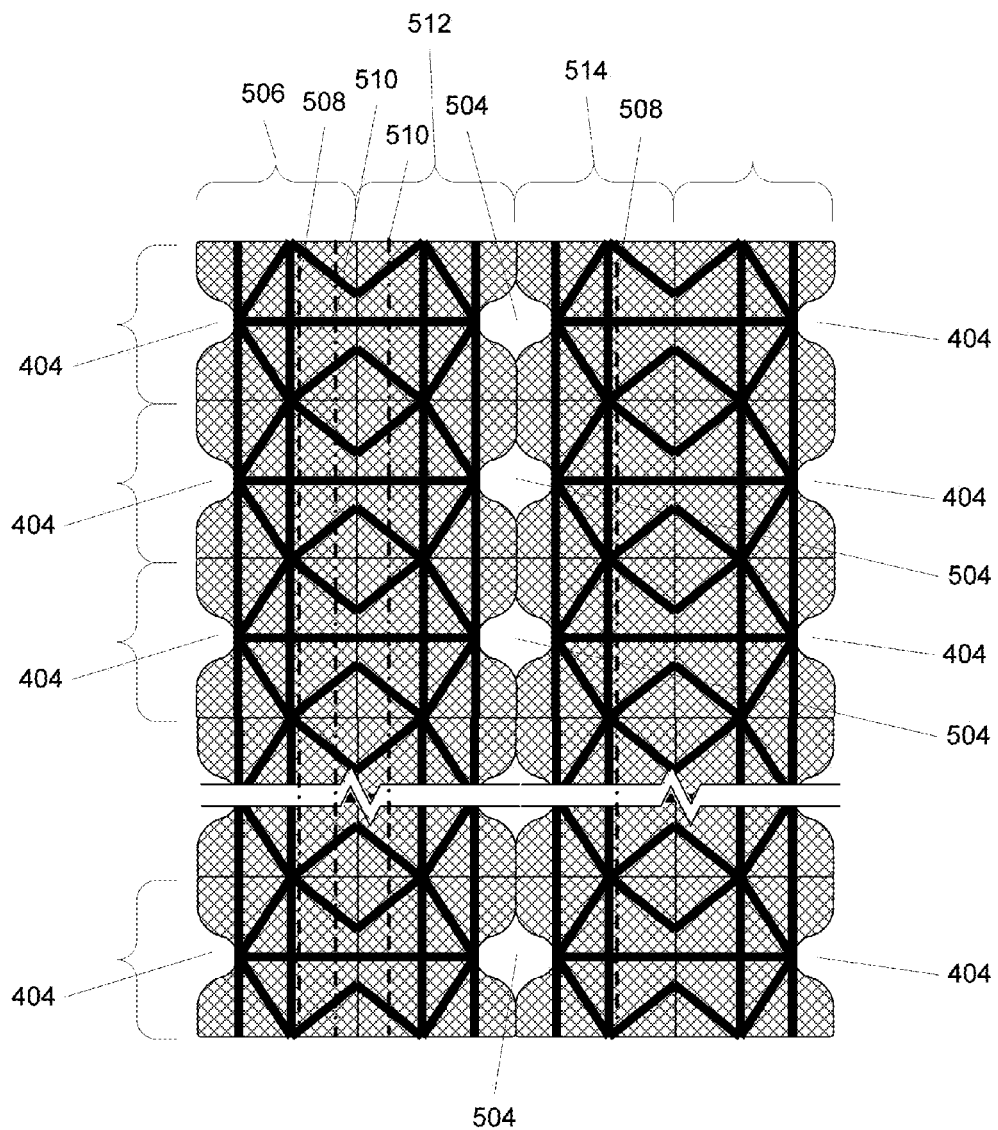
FIG. 5 illustrates, in simplified form, a sheet of particulate filters 100 constructed according to the teachings herein.

FIG. 5 illustrates, in simplified form, a sheet 500 of particulate filters 100 constructed according to the teachings herein. As shown, the sheet 500 is made up of an array of four by "n" individual filters 100. The manufacturing process for such a sheet is similar to that of the strip, except that, the edge areas 404 and the analogous internal areas 504 will need to be removed. In addition, as shown, the sheet 500 includes filters within the first column 506 that each include two lines of the optional perforations 508, 510. One line of perforations 510 (represented by an alternating dash-dot line) will, if used to separate one part of a filter form the other, will reduce the overall length of the filter. The other line of perforations 508 (also represented by an alternating dash-dot line) will, if used, typically remove the part of the filter containing the mouth filtration region 106 from the rest of the filter. As also shown, the filters in the second column 512 only include a single line of the optional perforations 510, in this case for length-shortening, whereas the filters in the third column 514 include a single line of the optional perforations 508 for removing the part that would act as the mouth filtration region. Of course, it should be understood that the filters 100 of the sheets 500 could be constructed so that they are all the same or in different permutations and combinations lacking or containing one or more of the features described herein (e.g., creases, perforations, etc.)

Note that, as shown, the lines of perforations 508, 510 are shown as straight lines. It is to be understood that the lines need not be straight, but should extend from one side of the filter to the other. In addition, it should be understood that other additional lines of perforations could be provided, including lines of perforations extending the length of the filter in the vertical direction (based upon the orientation when the filter is in use) to allow for, for example, filter width reduction as well. Note further that, for some implementations, the removed portions may thereafter have independent utility as a particulate filter.

Advantageously, the sheet approach allows a large number of filters 100 to occupy a relatively small volume. For example, a 9" by 12" (~23 cm by 30.5 cm) sheet can contain an array of twelve filters 100, so only about 31 sheets, at about the thickness of a published magazine, would contain an entire year's supply of filters 100 for one person and a year's supply of filters 100 for a family of four would not be much thicker than the thickness of a typical hardcover novel. This is valuable because, in poor areas where the $PM_{2.5}$ particulates are a significant problem, storage space may be at a premium.

Depending upon the particular implementation, particulate filters 100 constructed as described herein can be packaged individually or packed together in larger quantities as desired. In instances where formation involves use of a release liner or backing, in some cases, the release liner or backing will be disposed of after formation but before packaging. In other cases, the release liner/backing may be constructed to make application easier and, thus be retained when packed. The creation of individual or bulk sterile packages of items for distribution is otherwise well known, so that aspect will not be discussed herein.

As a further matter, it should be noted that, while the foregoing filters 100 provide significant advantages, there are circumstances where they may not be fully effective, for example, if used by people with beards, thick moustaches and/or other facial hair around the mouth area. Nevertheless, the foregoing design, if applied properly, can still provide significant nasal filtration, even if less than optimal. Given the potentially harmful nature of $PM_{2.5}$ particulates, even partial filtration is better than no filtration at all.

Usage of the Particulate Filter

A significant advantage to the draping particulate filters 100 constructed as described herein is their ease of use and comfort relative to filters that must be inserted into the nostrils or face filters 100 that are held on via straps fitted behind the user's ears or head.

To use the particulate filters 100 constructed according to one example implementation as described herein, the user takes a filter and places it so that the bottom of the cutout area 404 is just below the apex of the user's nose with the user's nose apex between the tabs 108 within the cutout area 404 and applies the tabs 108, via the adhesive, over the outside of the nose (the ala of the nose), such as previously shown in FIGS. 2A-2B, so that the nasal filtration area 104 is draped in front of and is either in close proximity to, or in some cases covers, the users nostrils. The user then manipulates the filter 100, visa the creases 206, such that the mouth filtration area 106 lies in close proximity to (or touches) the user's mouth and, ideally is in close proximity to the user's face all around the peripheral edge so as to enhance the "draw" of the diaphanous PM filter material towards the mouth during mouth inhalation. Note here that, since the filter 100 is only affixed to the ala of the nose; the remainder hangs free in a draping configuration such that it can "flap" inwards and outwards as the user inhales and exhales, providing significant user comfort.

To use the particulate filters 100 constructed with the optional line(s) of perforations as described herein, the user can separate one portion from another using the perforations before applying the tabs 108 or they can apply the tabs and then use the perforations to remove some portion, so that the nasal filtration area 104 is draped in front of and is either in close proximity to, or in some cases covers, the users nostrils but, for example, the overall length is reduced so that the particulate filter 100 does not extend below the user's chin or so that the mouth filtration portion is removed substantially or entirely, in the latter case, the draping configuration will still allow the filter 100 to "flap" inwards on nostril inhalation and outwards on nostril exhalation but will leave the mouth substantially or entirely uncovered.

Figure 6:
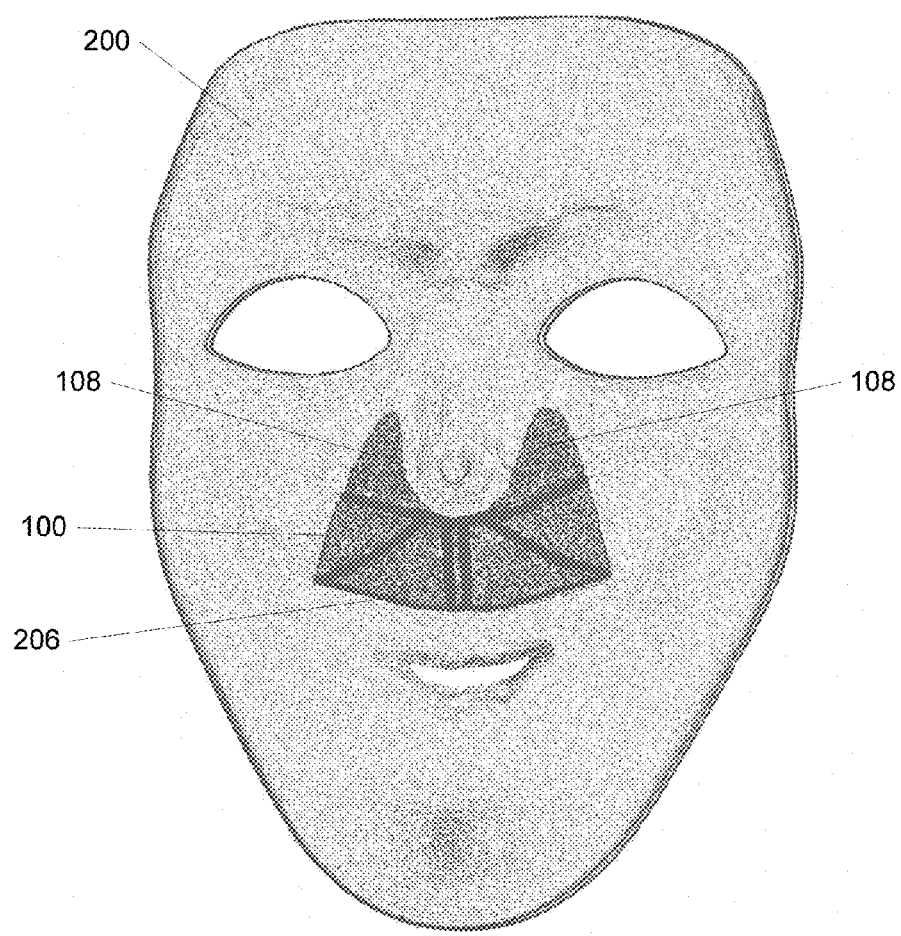
FIG. 6 illustrates, in simplified form, the filter of FIG. 2A when the lower portion has been folded up and under.
Figure 9:
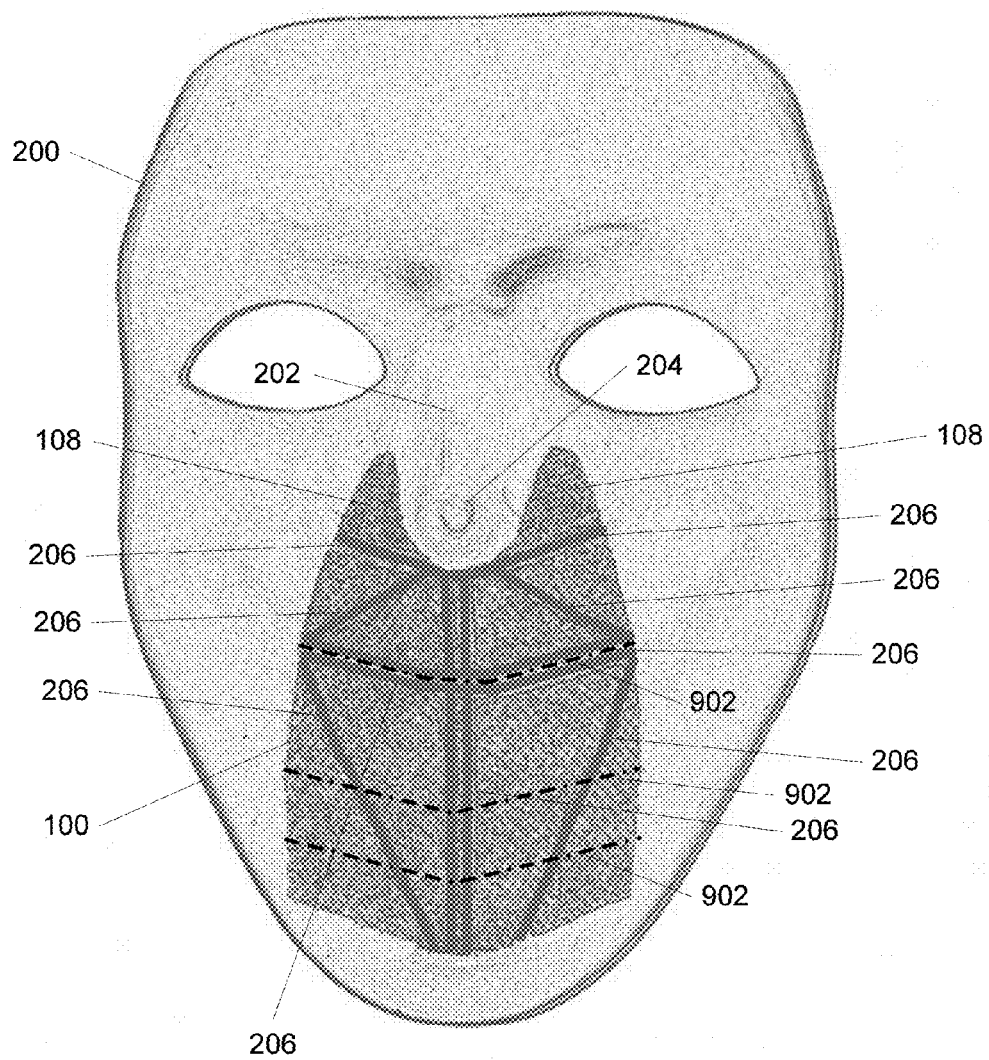
FIG. 9 illustrates, in a simplified form, a front view of another example implementation of a draping particulate filter constructed as described herein, positioned on a representation of a human face.
Figure 11:
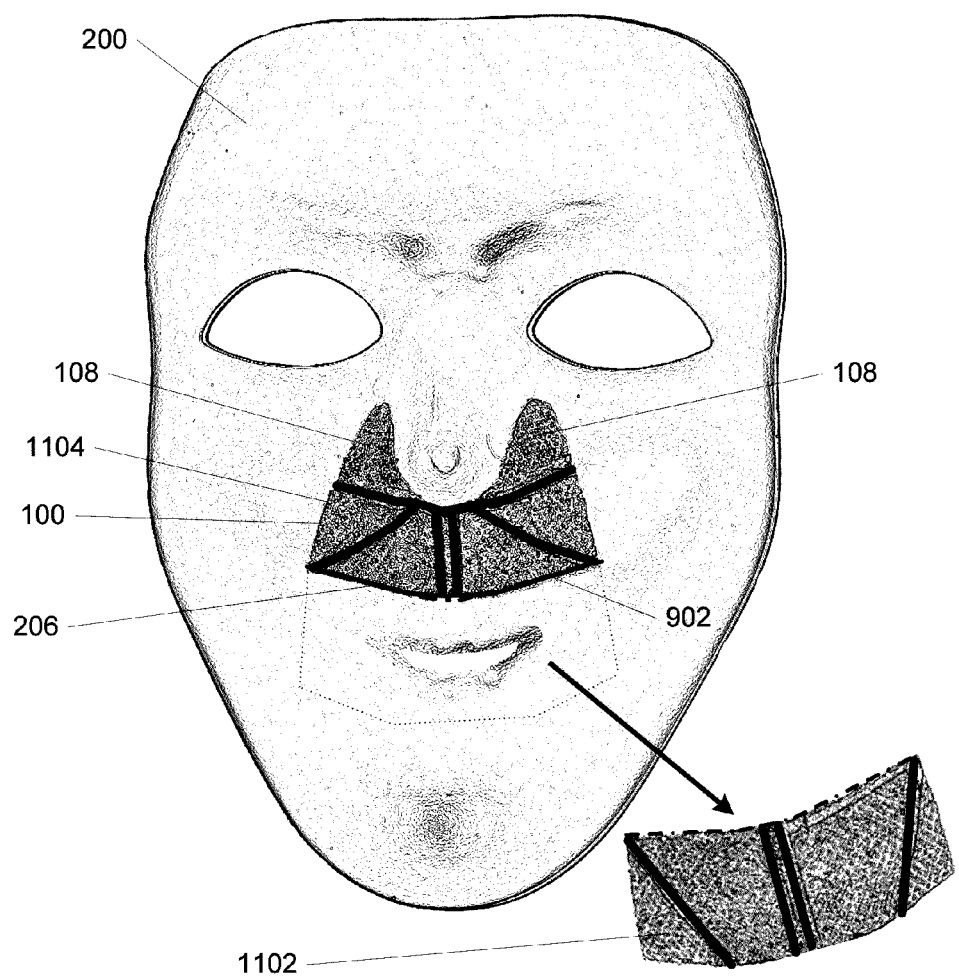
FIG. 11 illustrates, in simplified form, the filter of FIG. 9 after separation of a part from the draping particulate filter using one line of perforations.

In addition, if the user needs to eat, drink, smoke, expectorate, etc, they can merely fold the lower portion of the filter (i.e., containing the mouth filtration area 106) up on the outside of the filter or under on the inside of the filter along a crease, or, if perforations are present and the mouth filtration area 106 will no longer be needed, separate/remove the mouth filtration region 106 from the rest of the filter 100 using the perforations between the two, which will leave the nasal filtration area 104 relatively unaffected. FIG. 6 illustrates, in simplified form, the filter 100 of FIG. 2A when the lower portion has been folded up and under (i.e. between the upper portion and the user's face). FIG. 9 illustrates, in simplified form, a filter 100 similar to that of FIG. 2A except that the overall filter 100 is longer and includes multiple optional line(s) of perforations 902 as described herein. FIG. 11 illustrates, in simplified form, a filter 100 similar to that of FIG. 9, but after the lower portion 1102 has been removed (indicated by the arrow) from the remainder 1104 of the filter 100 by separating using one line of perforations 902.

Figure 7:
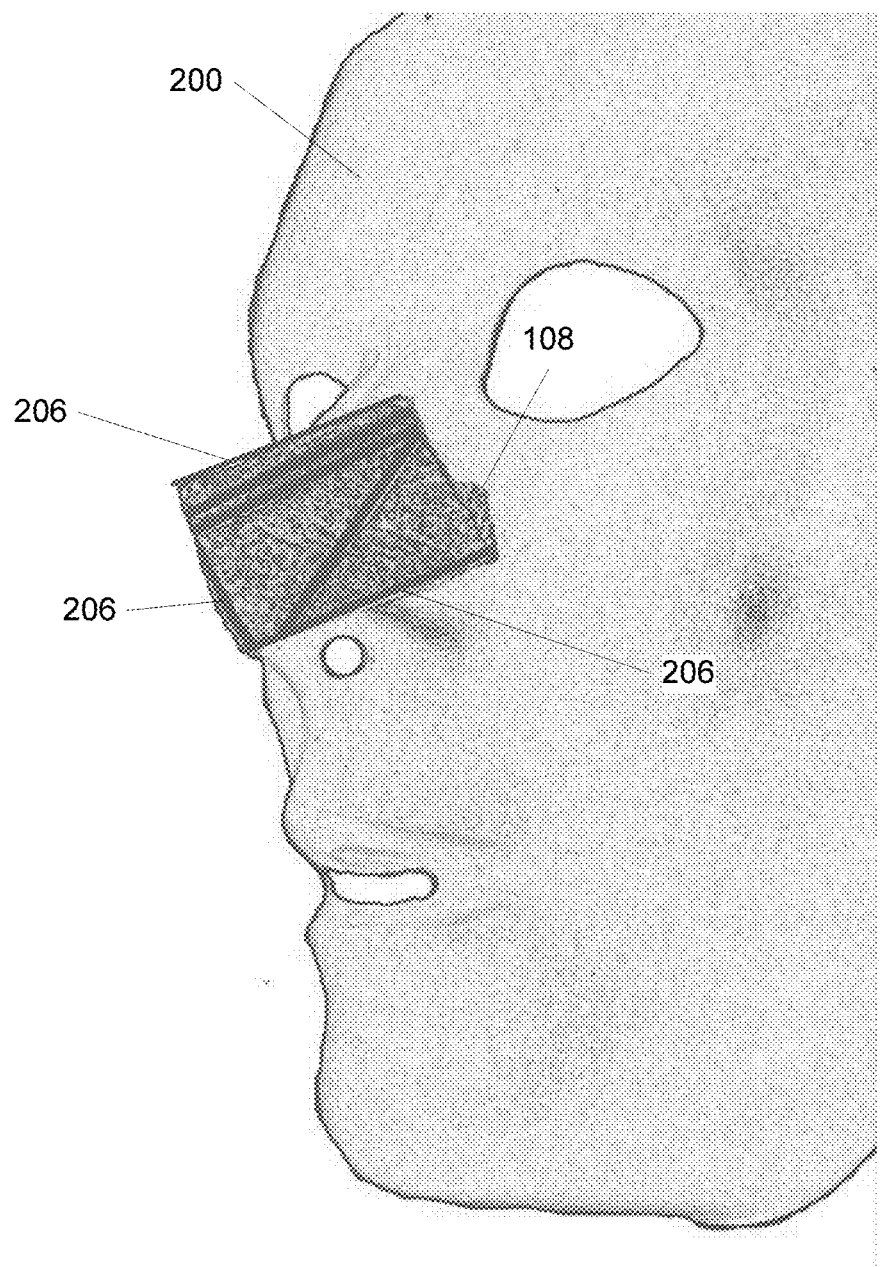
FIG. 7 illustrates, in simplified form, the filter of FIG. 2A after part of the filter has been folded up to uncover the nostril for blowing the nose without removing or repositioning the filter tabs.

Likewise, if the user needs to temporarily have access to their nostrils, for example, to merely blow their nose or sneeze, they can fold the lower portion up entirely such that their nostrils and mouth are both exposed. Advantageously, in doing so, the tabs 108 of the filter 100 need not be removed and when the user is done, that portion of the filter can be lowered and re-draped to resume filtering during inhalation. FIG. 7 illustrates, in simplified form, the filter of FIG. 2A after part of the filter has been folded up to uncover the nostrils for blowing the nose or sneezing without removing or repositioning the tabs.

Figure 8A:
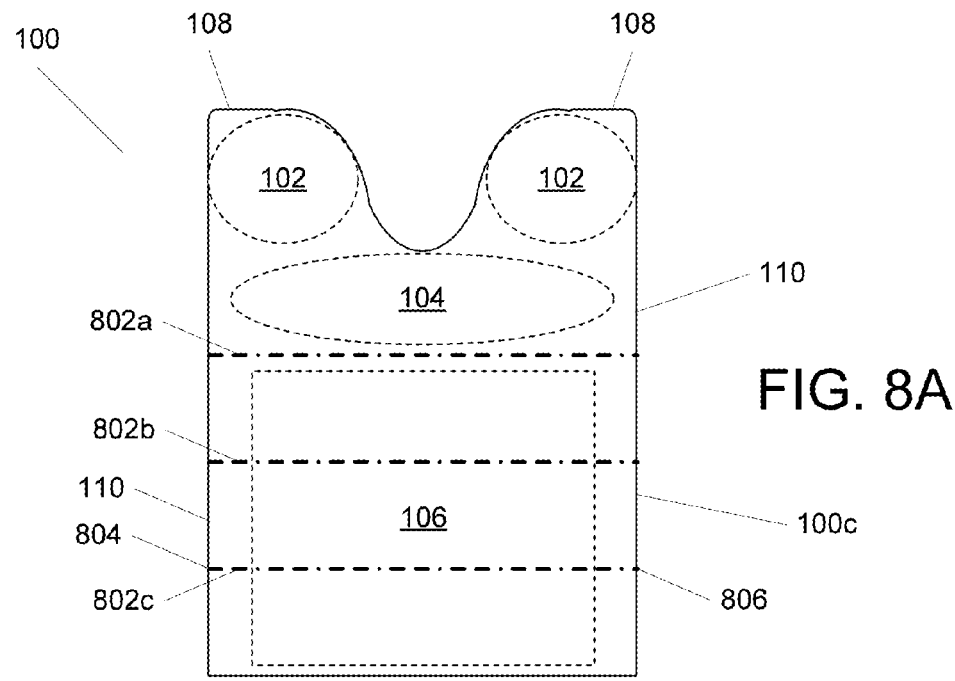
FIGS. 8A-8B illustrate, in simplified form, functional examples of two different alternative implementations of a draping particulate filter constructed according to the teaching herein.
Figure 8B:
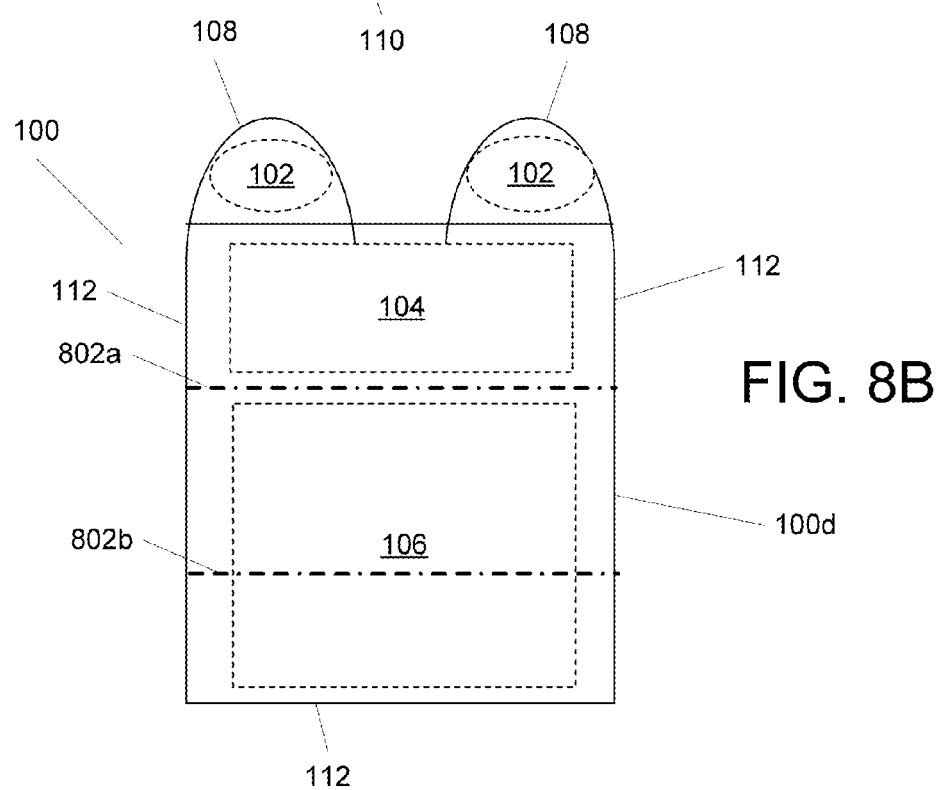

FIGS. 8A-8B illustrate, in simplified form, additional functional examples of two different alternative implementations 100c, 100d of a draping particulate filter 100 constructed according to the teachings herein similar to the filters 100a, 100b of FIGS. 1A-1B. As shown in FIG. 8A, the draping particulate filter 100a optionally includes at least one, and in this case three, lines of perforations 802a, 802b, 802c that extend from one side 804 of the filter 100 to the other side 806 of the filter (i.e., across the filter's width). The first line of perforations 802a allows for separation of the nasal filtration region 104 and mouth filtration region 106, and the other two lines of perforations 802b, 802c allow for shortening of the filter 100c and/or removal of part of the mouth filtration region 106 while leaving the nasal filtration region 104 intact. FIG. 8B is similar to the filters of FIGS. 2B and 8A except that it only includes two lines of perforation 802a, 802b as described above. Of course, it is to be understood that any number of lines of the optional perforations, from one to three or more, can be included.

Figure 10A:
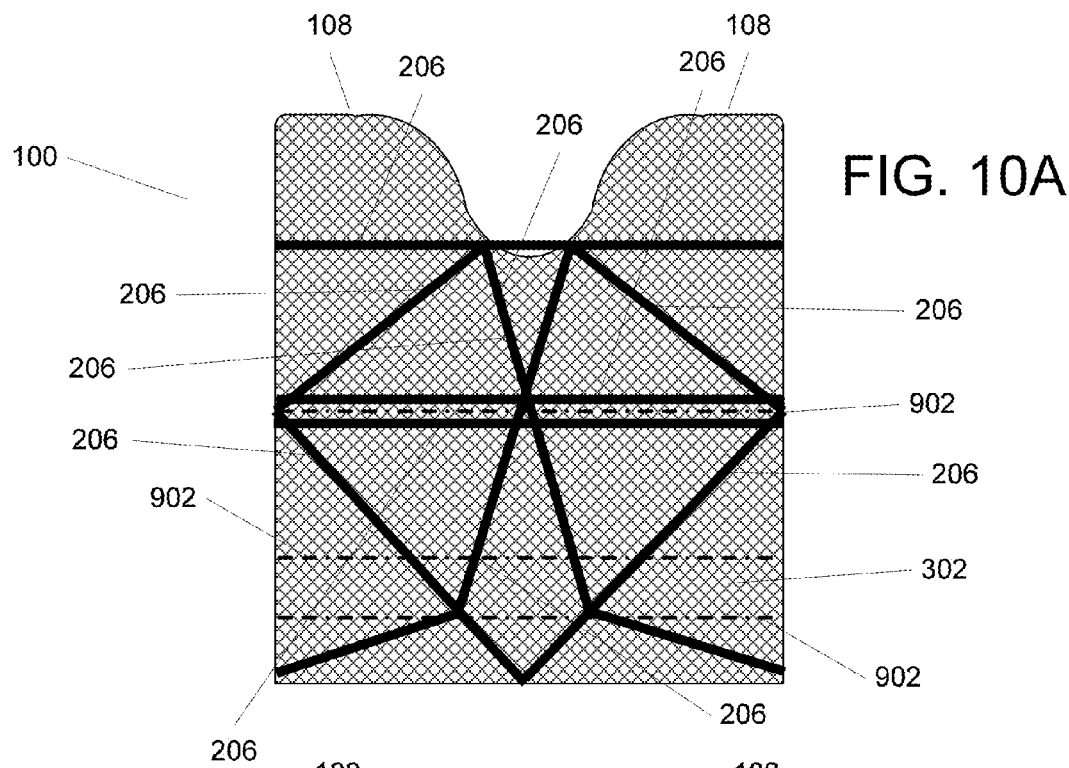
FIGS. 10A-10C illustrate, in simplified form, three additional alternative example implementations of draping particulate filters constructed as described herein.
Figure 10B:
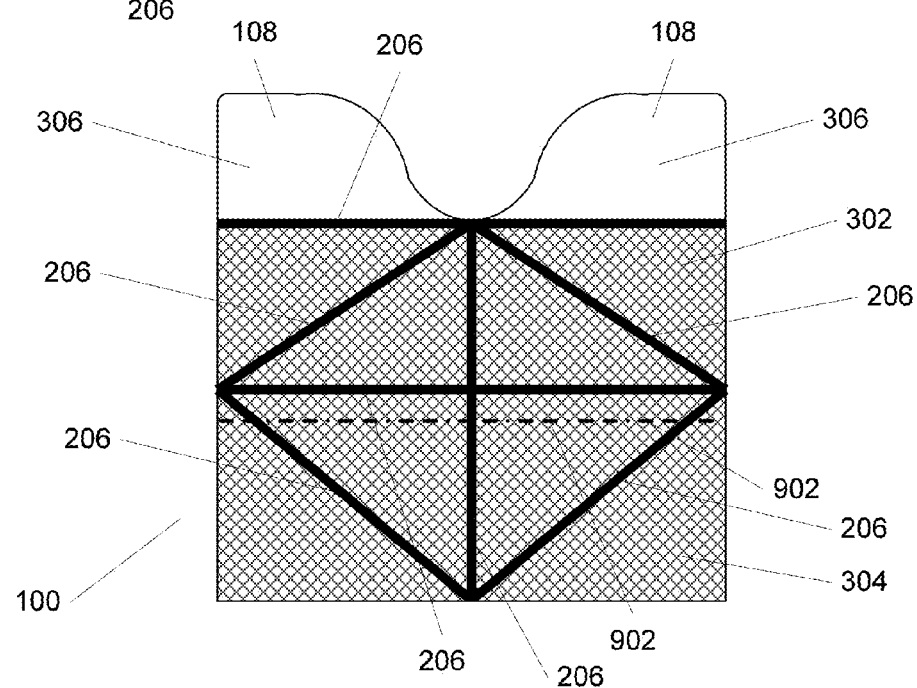
Figure 10C:
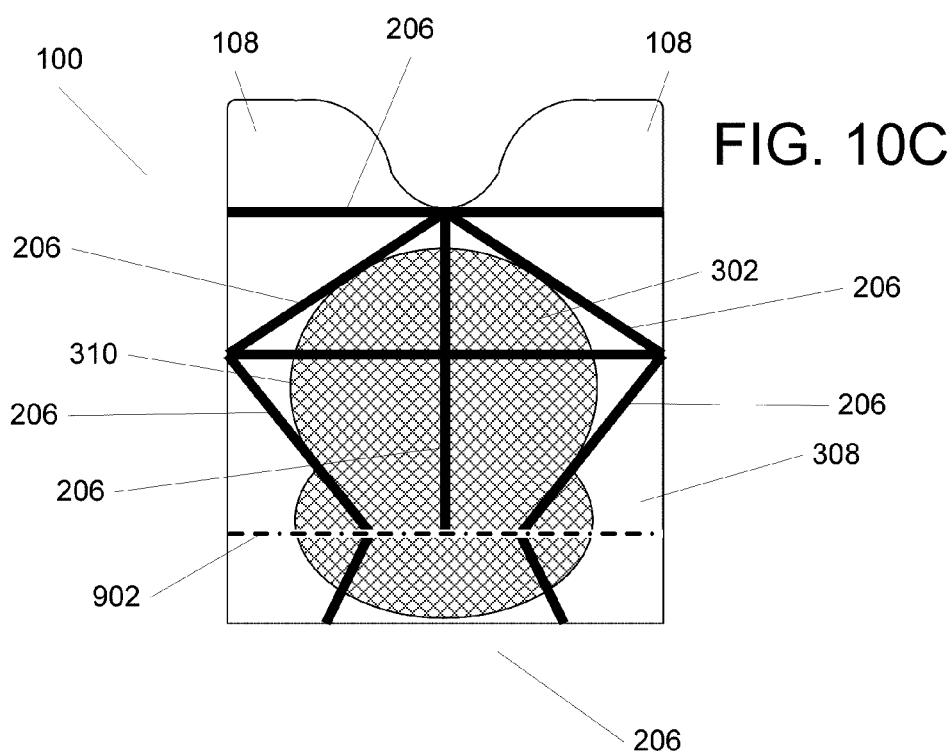

FIGS. 10A-10C illustrate, in simplified form, three additional alternative example implementations of draping particulate filters 100 as described herein, similar to those of FIGS. 3A-3C except that they are longer and include the optional perforations 902 as described herein.

Figure 12:
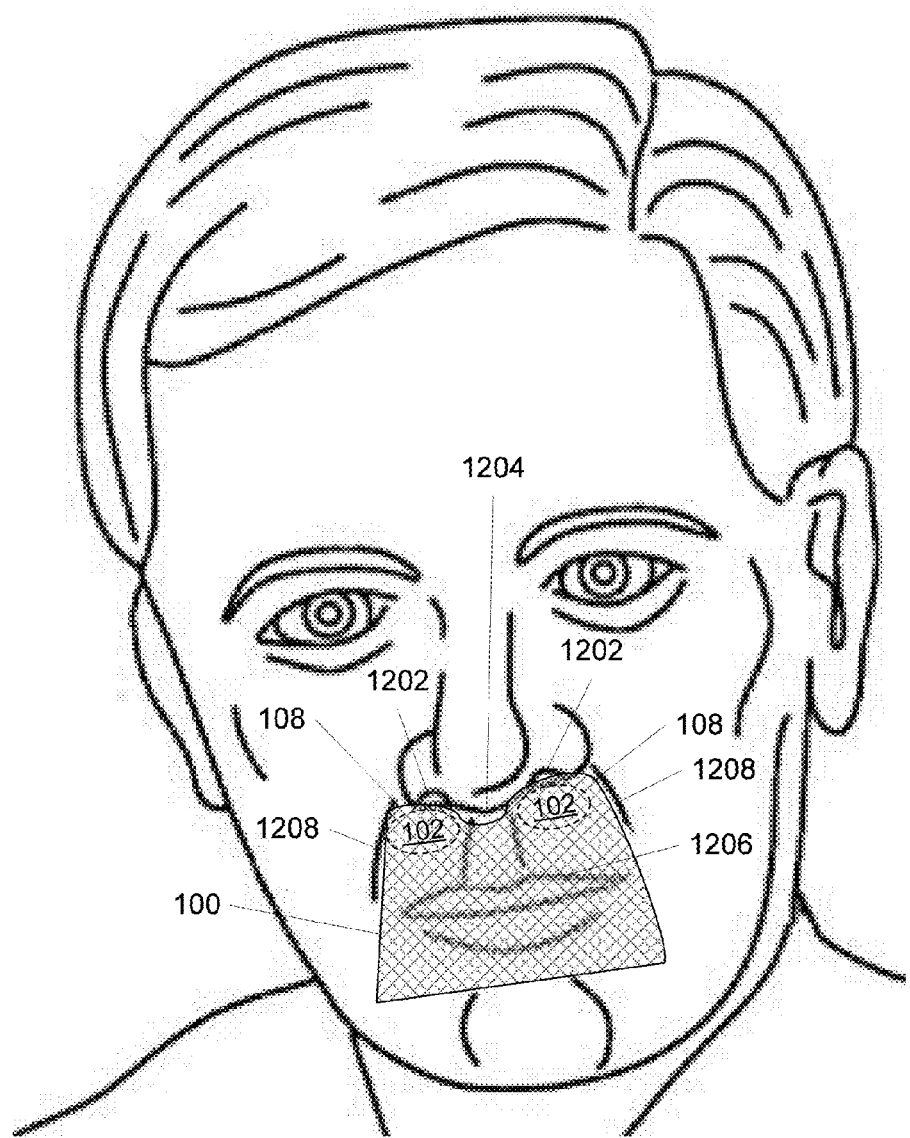
FIG. 12 illustrates, in simplified form, one example of an alternative usage for a draping particulate filter constructed as described herein.

FIG. 12 illustrates, in simplified form, one example of an alternative usage for a draping particulate filter 100 constructed as described herein.

As shown, the draping particulate filter 100 of FIG. 12 has been applied so that the tabs 108 are attached to the user beneath his nostrils 1202, between the nasal base 1204 and upper lip 1206, and within the user's nasal labial folds 1208 such that it lies across the user's philtrum, to thereby hang freely in front of, and in close proximity to, the user's mouth, while leaving the nostrils uncovered.

Figure 13:
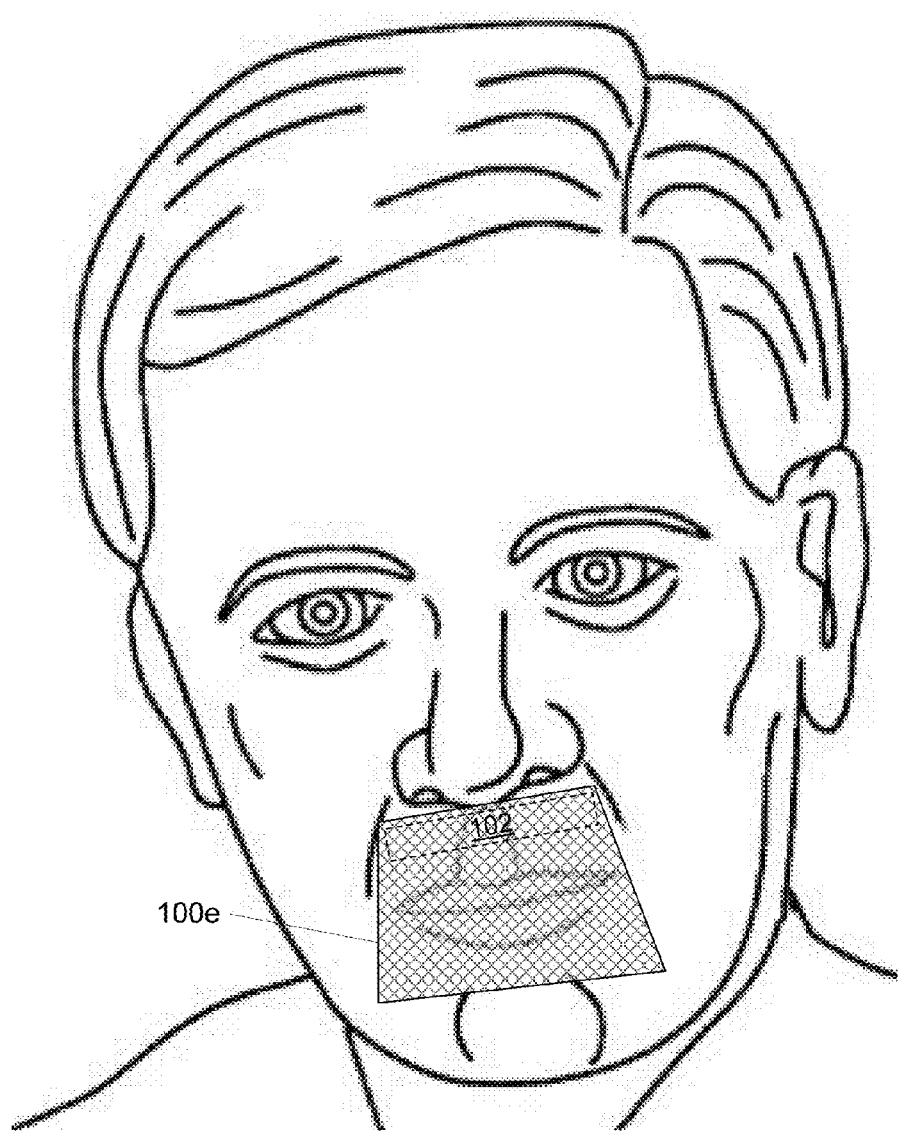
FIG. 13 illustrates, in simplified form, another example of an alternative example of my draping particulate filter.

FIG. 13 illustrates, in simplified form, an alternative example of a draping particulate filter 100e as described herein. As shown the draping particulate filter of FIG. 13, is similar to that of FIG. 12, except that it does not formally include tabs 108. Rather, as noted above, the affixation region 102 is located near the upper edge 1302 of the draping particulate filter 100e, so that it can be applied in the manner of FIG. 12. In all other material respects, the draping particulate filter of FIG. 13 is the same as the draping particulate filter of FIG. 12.

At this point, it is to be understood that, for purposes of clarity in explanation only, the draping particulate filters of FIG. 12 and FIG. 13 do not contain the optional perforations or creases. It is to be understood however that any of the draping particulate filters described herein that contain the optional creases or perforations could be substituted for those of FIG. 12 or FIG. 13 for the same purpose without departing from the teachings herein.

Figure 14:
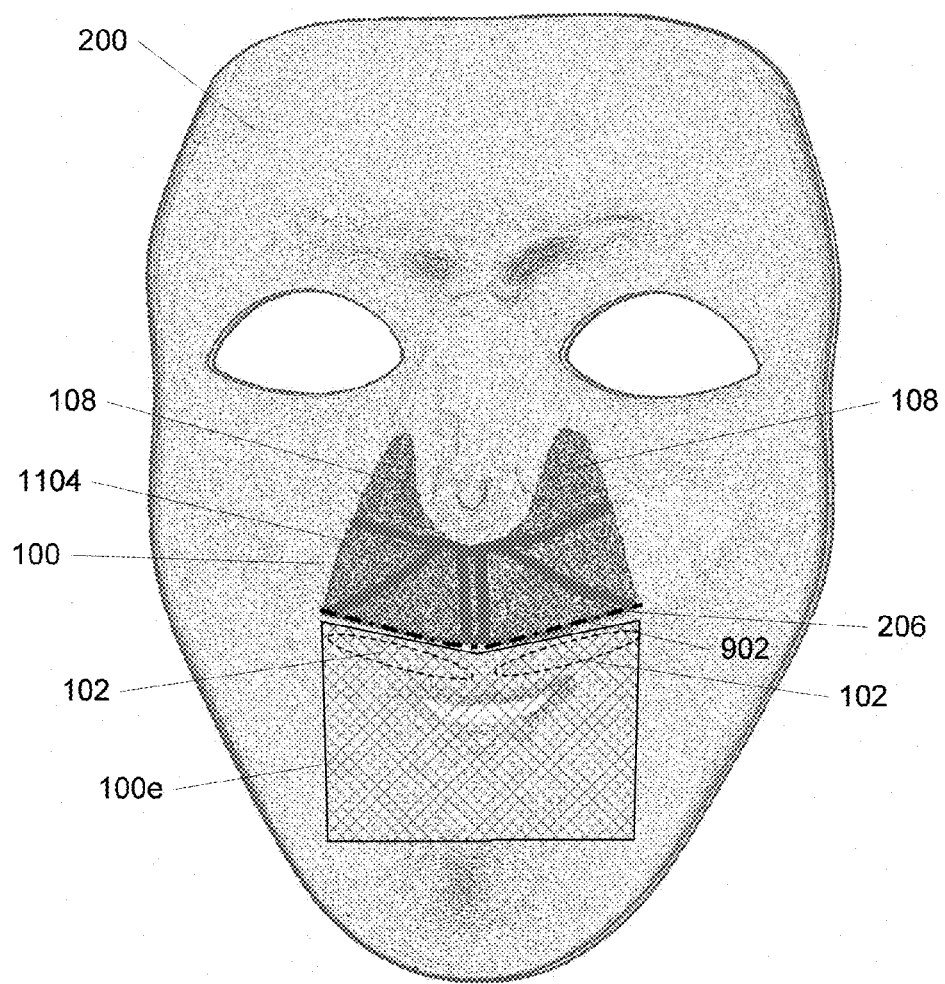
FIG. 14 illustrates, in simplified form, a final usage case involving draping particulate filters constructed and/or configured as described herein.

Finally, FIG. 14 illustrates, in simplified form, a final usage case involving draping particulate filters constructed and/or configured as described herein. As shown in FIG. 14, this use case involves a user using one draping particulate filter 100 applied as described previously (and which may, or may not, have had a lower portion for mouth filtration that was separated using optional perforations as described herein) and an independent and discrete second draping particulate filter 100e applied as described in connection with FIG. 12 and FIG. 13.

It should be understood that this description (including the figures) only includes some illustrative embodiments. For the convenience of the reader, the illustrative embodiments of the above description is a representative sample of all possible embodiments, a sample that teaches the principles of the invention. The description has not attempted to exhaustively enumerate all possible variations. That alternate embodiments may not have been presented for a specific portion of any variant, or that further non-described alternate embodiments may be available for a portion of a variant, is not to be considered a disclaimer (intentional or unintentional) of those alternate embodiments. One of ordinary skill will appreciate that many of those non-described embodiments incorporate the same principles of the claimed invention and that others are equivalent thereto.

What is claimed is:

1. A draping particulate filter, for use in front of at least a user's nostrils, comprising:
    diaphanous PM filter material;
    at least one affixation region, associated with a top portion of the diaphanous PM filter material;
    a biocompatible skin contact adhesive at least located within the at least one affixation region on a skin contact side of the draping particulate filter; and
    at least one line of perforations spanning from a first side of the diaphanous PM filter material to a second side of the diaphanous PM filter material, the at least one line of perforations being located between a first portion and a second portion, the first portion defining a nasal filtration region and the second portion defining a mouth filtration region;
    wherein the at least one line of perforations will allow for separation of the second portion from the first portion such that, following separation, only the first portion that defines the nasal filtration region will be part of the draping particulate filter,
    wherein the draping particulate filter has an outer peripheral shape bounding the diaphanous PM filter material such that, when adhered to either side of the user's nose via the biocompatible skin contact adhesive within the at least one affixation region, the diaphanous PM filter material below the at least one affixation region will hang free in front of the user's face and will substantially lie in close proximity to a portion of the user's face so that, upon inhalation by the user through their nostrils, the first portion of the hanging diaphanous PM filter material will be drawn towards the nostrils and act as the nasal filtration region and, upon inhalation by the user through their mouth, if the second portion has not been separated from the first portion using the at least one line of perforations, the second portion of the hanging diaphanous PM filter material will be drawn towards the mouth and act as the mouth filtration region, and
    wherein upon exhalation by the user through their nose, the nasal filtration region of the diaphanous PM filter material will move freely away from the user's nostrils, and, if the second portion has not been separated from the first portion using the at least one line of perforations, upon exhalation by the user through their mouth, the second portion of the hanging diaphanous PM filter material will move freely away from the user's mouth.

2. The draping particulate filter of claim 1, wherein the at least one line of the perforations is one of:
    a line of micro perforations, a series of laser-formed perforations, or a series of knife-cut perforations.

3. The draping particulate filter of claim 1, further comprising at least one crease positioned adjacent the at least one line of perforations.

4. The draping particulate filter of claim 1, wherein the particulate filter is one of multiple particulate filters arranged in a strip and wherein a part of the draping particulate filter opposite an end containing tabs includes a second line of perforations such that the part opposite the end containing the tabs is separable from the end containing the tabs via the second line of perforations.

5. A draping particulate filter making method comprising:
    forming, on a sheet of diaphanous PM filter material, a peripheral boundary for the particulate filter having therewithin an intended inhalation region;
    forming at least one line of perforations spanning from a first side edge of the diaphanous PM filter material to a second side edge of the diaphanous PM filter material and passing through the intended inhalation region; and
    defining at least one affixation region near an edge of the particulate filter by applying a biocompatible skin contact adhesive therewithin, such that when the biocompatible skin contact adhesive attaches the draping particulate filter by the at least one affixation region to a user by the alar nasal sulcus, the nasal lobule, the nasal ala, or beneath the nasal base across the user's philtrum, the diaphanous PM filter material below the at least one affixation region will hang freely in a draped fashion in close proximity to the user's face such that inhalation by the user via a breathing orifice will cause the diaphanous PM filter material to move towards and against the breathing orifice by which the user is inhaling and filter the inhaled air, and exhalation by the user will cause the diaphanous PM filter material to move away from user's face.

6. The method of claim 5 further comprising:
    packaging the particulate filter in a sealed sterile package.

7. The method of claim 5, wherein the sheet of diaphanous PM filter material comprises:
    multiple peripheral boundaries defining multiple particulate filters, wherein the multiple particulate filters are arranged in a strip, and wherein the at least one line of perforations is formed across the strip.

8. The method of claim 7, wherein the method further comprises:
    forming a second line of perforations across the strip on a side of the at least one line of perforations opposite a pair of tabs and spaced apart from the at least one line of perforations.

9. The method of claim 8, wherein the forming the second line of perforations comprises:
    forming the line through the intended inhalation region.

10. The method of claim 5, wherein the forming the at least one line of perforations comprises at least one of:
    (i) cutting or melting the diaphanous PM filter material using a laser,
    (ii) cutting the diaphanous PM filter material using a blade, or
    (iii) piercing the diaphanous PM filter material using a least one needle.

11. A draping particulate filter making method comprising:
    forming, on a sheet of diaphanous PM filter material, a peripheral boundary for the particulate filter having therewithin an intended inhalation region, the peripheral boundary including a pair of tabs;
    forming at least one line of perforations spanning from a first side edge of the diaphanous PM filter material to a second side edge of the diaphanous PM filter material and passing through the intended inhalation region; and
    defining at least one affixation region near an edge of the particulate filter by applying a biocompatible skin contact adhesive to the pair of tabs, such that when the biocompatible skin contact adhesive attaches the draping particulate filter by the at least one affixation region to a user by the alar nasal sulcus, the nasal lobule, the nasal ala, or beneath the nasal base across the user's philtrum, the diaphanous PM filer material below the at least one affixation region will hang freely in a draped fashion in front of the user's face, and in close proximity to a breathing orifice of the user, such that inhalation by the user will cause the diaphanous PM filter material to move towards and against the breathing orifice and filter the inhaled air, and exhalation by the user will cause the diaphanous PM filter material to move away from the user's face.

12. The method of claim 11 further comprising:
    packaging the particulate filter in a sealed sterile package.

13. The method of claim 11, wherein the sheet of diaphanous PM filter material comprises:
    multiple peripheral boundaries defining multiple particulate filters, wherein the multiple particulate filters are arranged in a strip, and wherein the at least one line of perforations is formed across the strip.

14. The method of claim 13, wherein the method further comprises:
    forming a second line of perforations across the strip on a side of the at least one line of perforations opposite the pair of tabs and spaced apart from the at least one line of perforations.

15. The method of claim 14, wherein the forming the second line of perforations comprises:
    forming the line through the intended inhalation region.

16. The method of claim 11 further comprising:
    forming at least one crease within at least part of the intended inhalation region.

* * * * *